US012412697B2

(12) United States Patent
Araki et al.

(10) Patent No.: US 12,412,697 B2
(45) Date of Patent: Sep. 9, 2025

(54) COIL COMPONENT

(71) Applicant: Murata Manufacturing Co., Ltd., Kyoto-fu (JP)

(72) Inventors: Kenichi Araki, Nagaokakyo (JP); Keiichi Ishida, Nagaokakyo (JP); Minoru Gibu, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 620 days.

(21) Appl. No.: 17/929,909

(22) Filed: Sep. 6, 2022

(65) Prior Publication Data

US 2022/0415567 A1 Dec. 29, 2022

Related U.S. Application Data

(63) Continuation of application No. PCT/JP2021/012477, filed on Mar. 25, 2021.

(30) Foreign Application Priority Data

Mar. 25, 2020 (JP) ................................ 2020-053576

(51) Int. Cl.
*H01F 27/29* (2006.01)
*H01F 17/00* (2006.01)
(Continued)

(52) U.S. Cl.
CPC ....... *H01F 27/292* (2013.01); *H01F 17/0013* (2013.01); *H01F 17/04* (2013.01); *H01F 27/2823* (2013.01); *H01F 2017/048* (2013.01)

(58) Field of Classification Search
CPC .... H01F 27/292; H01F 17/0013; H01F 17/04; H01F 27/2823; H01F 2017/048
See application file for complete search history.

(56) References Cited

U.S. PATENT DOCUMENTS 11,195,651 B2 * 12/2021 Kojima ................. H01F 27/255
11,763,978 B2 * 9/2023 Yang ....................... H01F 27/29 336/192

(Continued)

FOREIGN PATENT DOCUMENTS

JP 2005-340584 A 12/2005
JP 2011-108966 A 6/2011

(Continued)

OTHER PUBLICATIONS

International Search Report issued in PCT/JP2021/012477; mailed Jul. 6, 2021.

*Primary Examiner* — Malcolm Barnes
(74) *Attorney, Agent, or Firm* — Studebaker Brackett PLLC

(57) ABSTRACT

A highly reliable coil component having reduced electric resistance and improved bonding strength in a connection portion between a coil conductor and an external electrode. A coil component includes an element body including a coil conductor including a wound conductive wire coated with an insulating film, a magnetic portion containing metal magnetic particles and resin, and an external electrode on a surface of the element body and electrically connected to exposed surfaces, which are exposed on the surface of the element body, of extended portions of the coil conductor. The external electrode includes at least one or more layers. When an average crystal grain size of crystal grains constituting the coil conductor is defined as a and an average crystal grain size of crystal grains constituting a base electrode layer of the external electrode directly connected to the coil conductor is defined as b, a>b is satisfied.

20 Claims, 16 Drawing Sheets

(51) Int. Cl.
*H01F 17/04* (2006.01)
*H01F 27/28* (2006.01)

(56) References Cited

U.S. PATENT DOCUMENTS

| | | | | |
|---|---|---|---|---|
| 2011/0122540 | A1* | 5/2011 | Ogawa | H01G 4/30<br>361/305 |
| 2013/0258545 | A1* | 10/2013 | Yano | H01G 4/306<br>361/301.4 |
| 2018/0182539 | A1* | 6/2018 | Muneuchi | H01F 17/04 |

FOREIGN PATENT DOCUMENTS

| | | | | |
|---|---|---|---|---|
| JP | 2013-229582 | A | | 11/2013 |
| JP | 2015-046494 | A | | 3/2015 |
| JP | 2015170422 | A | * | 9/2015 |
| JP | 2016-103598 | A | | 6/2016 |
| JP | 2017-037891 | A | | 2/2017 |
| JP | 2018-107198 | A | | 7/2018 |
| JP | 2018-182201 | A | | 11/2018 |
| JP | 2018186175 | A | * | 11/2018 |

* cited by examiner

III-III CROSS-SECTIONAL VIEW

IV-IV CROSS-SECTIONAL VIEW

COIL COMPONENT

CROSS-REFERENCE TO RELATED APPLICATIONS

This application claims benefit of priority to International Patent Application No. PCT/JP2021/012477, filed Mar. 25, 2021, and to Japanese Patent Application No. 2020-053576, filed Mar. 25, 2020, the entire contents of each are incorporated herein by reference.

BACKGROUND

Technical Field

The present disclosure relates to a coil component.

Background Art

As an existing coil component, there has been disclosed a coil component including a main body portion having a rectangular parallelepiped shape and a pair of external terminal electrodes provided so as to cover a pair of opposing end surfaces of the main body portion, as described, for example, in Japanese Unexamined Patent Application Publication No. 2016-103598. The main body portion of the coil component includes a coil portion having a substrate and conductor patterns for a planar air-core coil provided on both upper and lower surfaces of the substrate.

SUMMARY

In the coil component disclosed in Japanese Unexamined Patent Application Publication No. 2016-103598, the external terminal electrodes are formed by applying a resin electrode material to the end surfaces and then performing metal plating on the resin electrode material. The pair of external terminal electrodes is connected to the conductor pattern for the planar air-core coil.

Meanwhile, at present, the coil component is required to be miniaturized, and it is important to improve connectivity between a pair of external terminal electrodes and a conductor pattern for a planar air-core coil. When the coil component as disclosed in Japanese Unexamined Patent Application Publication No. 2016-103598 is miniaturized, the contact area between the conductor pattern for the planar air-core coil and the pair of external terminal electrodes is reduced, and thus there is a concern that the connectivity therebetween is reduced. Furthermore, there is a risk that the electric resistance increases, and there is also a problem that the mechanical strength decreases.

Therefore, the present disclosure provides a coil component having high reliability by reducing electric resistance and improving bonding strength at a connection portion between a coil conductor and an external electrode.

A coil component according to the present disclosure is a coil component that includes an element body including a coil conductor formed by winding a conductive wire coated with an insulating film and a magnetic portion containing metal magnetic particles and resin, and an external electrode arranged on a surface of the element body to be electrically connected to an exposed surface of an extended portion of the coil conductor. The exposed surface is exposed on the surface of the element body, in which the external electrode includes at least one or more of layers. When an average crystal grain size of crystal grains constituting the coil conductor is defined as a, and an average crystal grain size of crystal grains constituting the layer of the external electrode directly connected to the coil conductor is defined as b, a>b is satisfied.

In the coil component according to the present disclosure, when the average crystal grain size of the crystal grains constituting the coil conductor is defined as a and the average crystal grain size of the crystal grains constituting the layer of the external electrode directly connected to the coil conductor is defined as b, a>b is satisfied, therefore, an arrangement is easily made such that the shapes of surfaces of the crystal grains of the external electrode follow surfaces of the crystal grains constituting the exposed surface of the coil conductor, whereby inclusion of resin or cavities between the coil conductor and the external electrode is suppressed, electric resistance between the coil conductor and the external electrode can be reduced, and further bonding strength can also be improved.

According to the present disclosure, it is possible to provide a coil component having high reliability by reducing electric resistance and improving bonding strength at a connection portion between a coil conductor and an external electrode.

The above and other objects, features and advantages of the present disclosure will become more apparent from the following description of embodiments with reference to the accompanying drawings.

BRIEF DESCRIPTION OF THE DRAWINGS

FIG. 5B is an enlarged cross-sectional view of a portion a;

DETAILED DESCRIPTION

1. Coil Component

Hereinafter, a coil component according to a first embodiment of the present disclosure will be described in detail with reference to the drawings.

Figure 1:
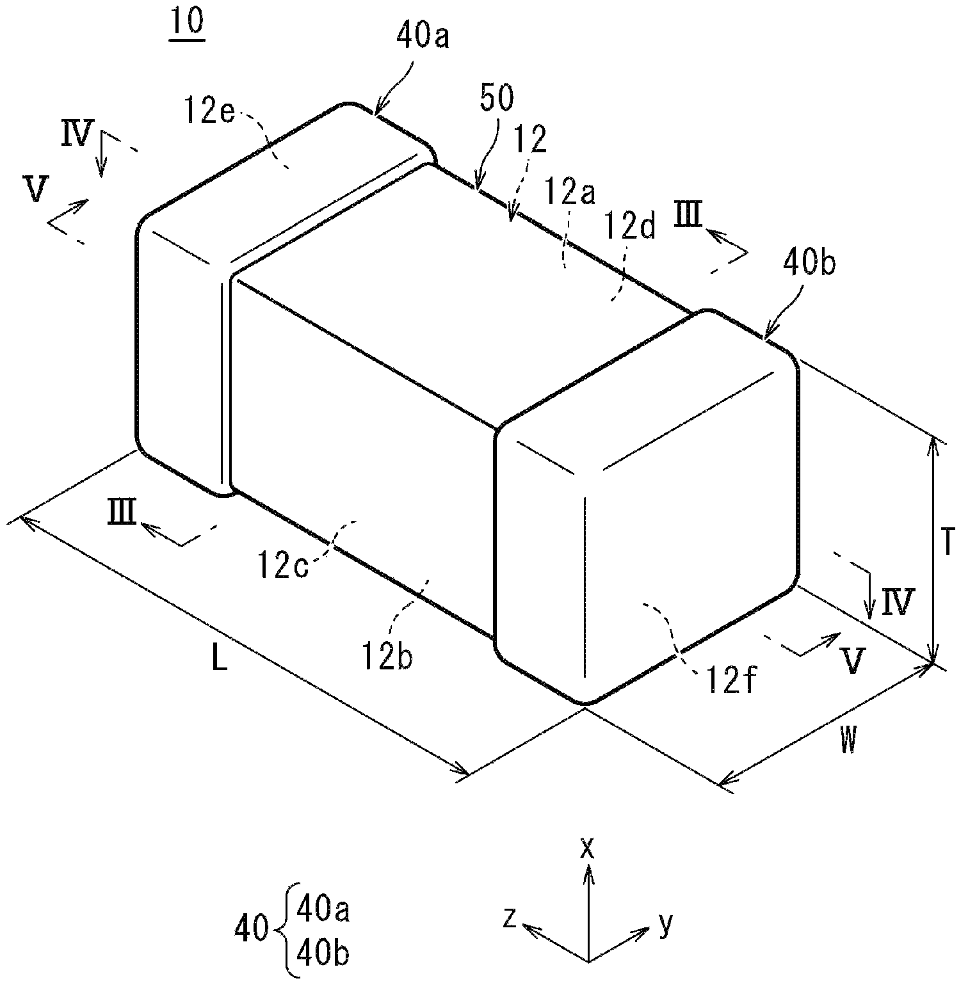
FIG. 1 is an external perspective view schematically illustrating a first embodiment of a coil component of the present disclosure.
Figure 2:
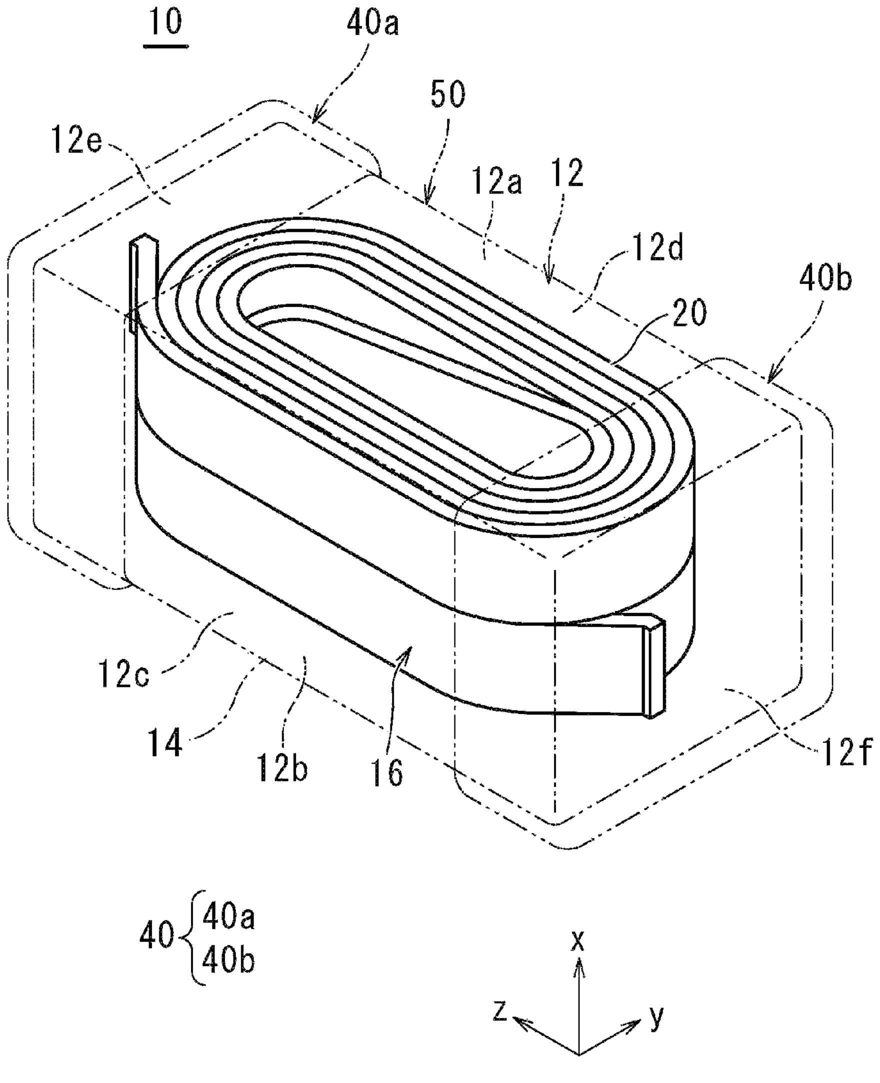
FIG. 2 is a transparent perspective view of a magnetic portion in which a coil conductor is embedded in the coil component illustrated in FIG. 1.
Figure 3:
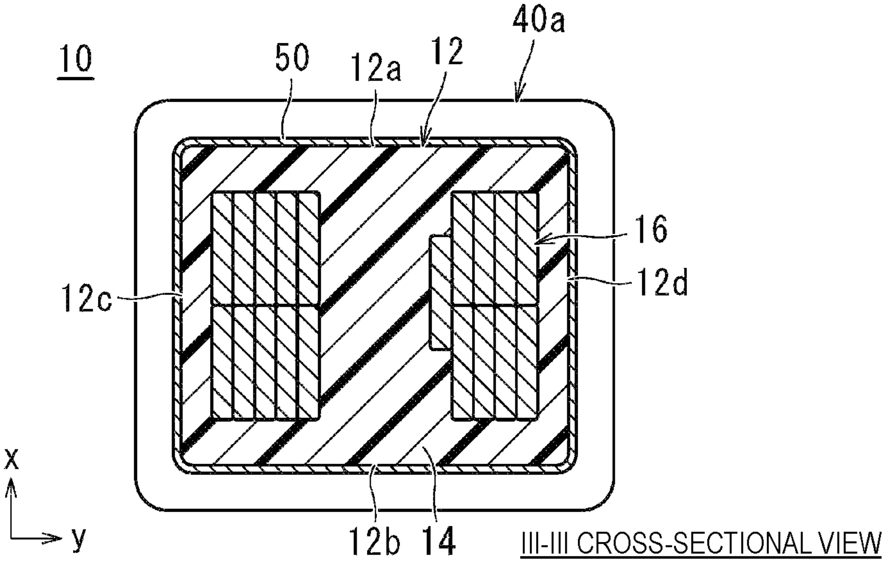
FIG. 3 is a cross-sectional view taken along line of FIG. 1, illustrating the coil component according to the present disclosure.
Figure 4:
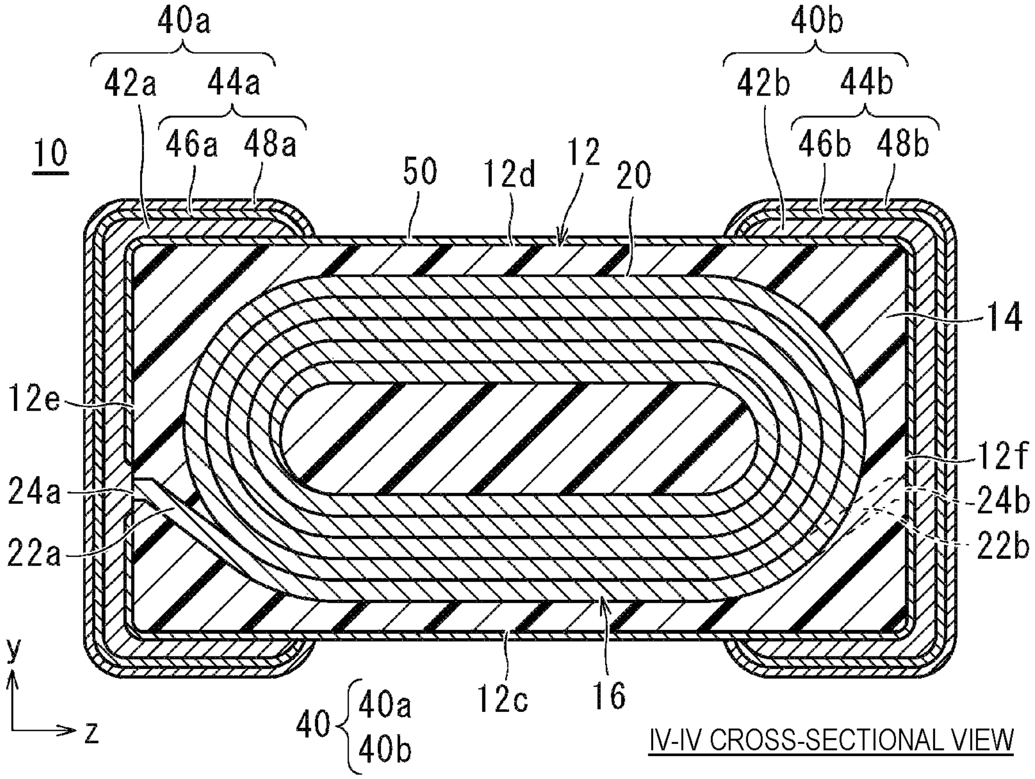
FIG. 4 is a cross-sectional view taken along line IV-IV of FIG. 1, illustrating the coil component according to the present disclosure.
Figure 5A:
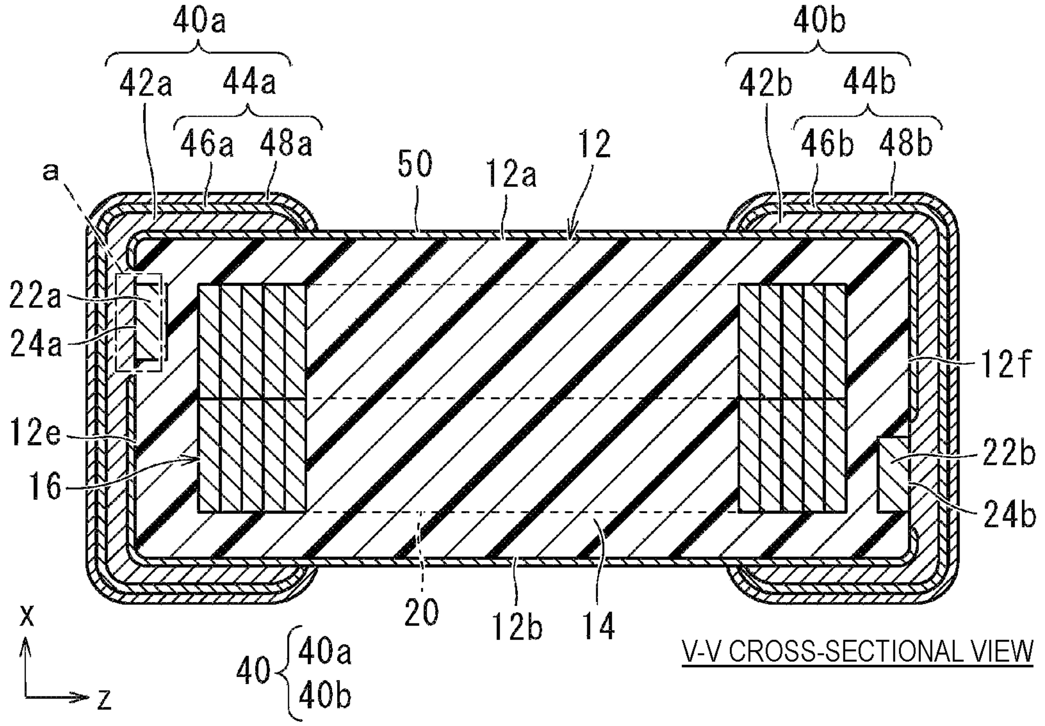
FIG. 5A is a cross-sectional view taken along line V-V of FIG. 1 illustrating the coil component according to the present disclosure.
Figure 5B:
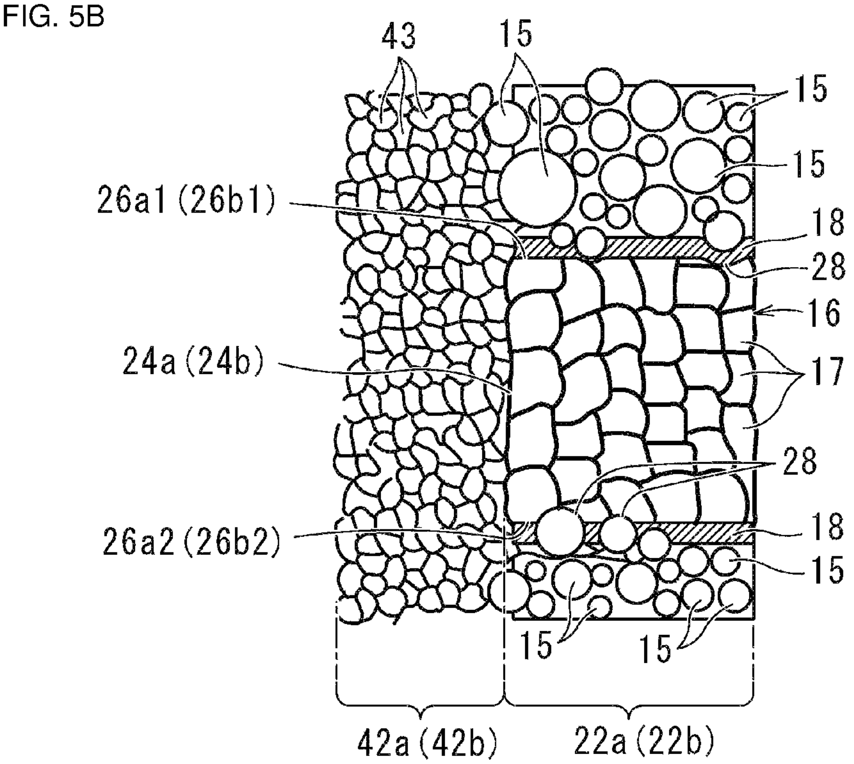

FIG. 1 is an external perspective view schematically illustrating the first embodiment of the coil component of the present disclosure. FIG. 2 is a transparent perspective view of a magnetic portion in which a coil conductor is embedded in the coil component illustrated in FIG. 1. FIG. 3 is a cross-sectional view taken along line of FIG. 1, illustrating the coil component according to the present disclosure. FIG. 4 is a cross-sectional view taken along line IV-IV of FIG. 1, illustrating the coil component according to the present disclosure. FIG. 5A is a cross-sectional view taken along line V-V of FIG. 1 illustrating the coil component according to the present disclosure, and FIG. 5B is an enlarged cross-sectional view of a portion a.

A coil component 10 includes a rectangular parallelepiped element body 12 and an external electrode 40.

(A) Element Body

The element body 12 includes a magnetic portion 14 and a coil conductor 16 embedded in the magnetic portion 14. The element body 12 has a first main surface 12*a* and a second main surface 12*b* opposite to each other in a pressurization direction x, a first side surface 12*c* and a second side surface 12*d* opposite to each other in a width direction y orthogonal to the pressurization direction x, and a first end surface 12*e* and a second end surface 12*f* opposite to each other in a length direction z orthogonal to the pressurization direction x and the width direction y. The dimensions of the element body 12 are not particularly limited.

(B) Magnetic Portion

The magnetic portion 14 contains metal magnetic particles and a resin material.

The resin material is not particularly limited, and examples thereof include thermosetting resins, and organic materials such as epoxy resins, phenol resins, polyester resins, polyimide resins, and polyolefin resins. Only one or two or more types of resin materials may be used.

The metal magnetic particles preferably include first metal magnetic particles and second metal magnetic particles, but may include only the first metal magnetic particles.

The first metal magnetic particles have an average particle size of equal to or more than 10 μm. In addition, the first metal magnetic particles preferably have the average particle size of equal to or less than 200 μm, more preferably equal to or less than 100 μm, and still more preferably equal to or less than 80 μm. By setting the average particle size of the first metal magnetic particles to equal to or more than 10 μm, the magnetic characteristics of the magnetic portion are improved.

The average particle size of the second metal magnetic particles is smaller than that of the first metal magnetic particles. The second metal magnetic particles have the average particle size of equal to or less than 5 μm. As such, when the average particle size of the second metal magnetic particles is smaller than the average particle size of the first metal magnetic particles, the filling property of the metal magnetic particles in the magnetic portion 14 is further improved, and thus the magnetic characteristics of the coil component 10 can be improved.

Here, the average particle size means an average particle size D50 (cumulative percentage of volume basis 50% equivalent particle size). The average particle size D50 can be measured by, for example, a dynamic light scattering particle size analyzer (UPA manufactured by Nikkiso Co., Ltd.).

The first metal magnetic particles and the second metal magnetic particles are not particularly limited, and examples thereof include iron, cobalt, nickel, gadolinium, and an alloy containing one or two or more thereof. Preferably, the first metal magnetic particles and the second metal magnetic particles are iron or an iron alloy. The iron alloy is not particularly limited, and examples thereof include Fe—Si, Fe—Si—Cr, Fe—Ni, Fe—Si—Al, and the like. The first metal magnetic particles and the second metal magnetic particles of one type or two or more types may be used.

The surfaces of the first metal magnetic particles and the second metal magnetic particles may be covered with an insulating coating. By covering the surfaces of the metal magnetic particles with an insulating coating, the internal resistance of the magnetic portion 14 can be increased. In addition, since the surfaces of the metal magnetic particles are covered by the insulating coating to ensure insulation, it is possible to suppress short-circuit failure with the coil conductor 16.

Examples of materials for the insulating coating include oxides of silicon, phosphate glass, bismuth glass, and the like. In particular, an insulating coating by zinc phosphate glass in which mechanochemical treatment is performed on the metal magnetic particles is preferable.

The thickness of the insulating coating is not particularly limited, but may be preferably equal to or more than 5 nm and equal to or less than 500 nm (i.e., from 5 nm to 500 nm), more preferably equal to or more than 5 nm and equal to or less than 100 nm (i.e., from 5 nm to 100 nm), and even more preferably equal to or more than 10 nm and equal to or less than 100 nm (i.e., from 10 nm to 100 nm). By further increasing the thickness of the insulating coating, the resistance of the magnetic portion 14 can be further increased. In addition, by further reducing the thickness of the insulating coating, the amount of the metal magnetic particles in the magnetic portion 14 can be further increased, and the magnetic characteristics of the magnetic portion 14 are improved.

The content of the first metal magnetic particles and the second metal magnetic particles in the magnetic portion 14 is preferably equal to or more than 50% by volume, more preferably equal to or more than 60% by volume, and still more preferably equal to or more than 70% by volume with respect to the entire magnetic portion. By setting the content of the first metal magnetic particles and the second metal magnetic particles in such ranges, the magnetic characteristics of the coil component of the present disclosure are improved. In addition, the content of the first metal magnetic particles and the second metal magnetic particles is preferably equal to or less than 99% by volume, more preferably equal to or less than 95% by volume, and still more preferably equal to or less than 90% by volume with respect to the entire magnetic portion 14. By setting the content of the first metal magnetic particles and the second metal magnetic particles in such ranges, the resistance of the magnetic portion 14 can be further increased.

In the surface portion of the magnetic portion 14, a region adjacent to the coil conductor 16 may be removed. By removing the magnetic portion 14 in the region adjacent to the coil conductor 16, a gap between the magnetic portion 14 and the coil conductor 16 is increased, and a medium easily enters during the barrel plating process, so that a plating film is formed over a wider area of the coil conductor 16. As such, an improvement of bonding strength and a reduction in electric resistance are expected.

(C) Coil Conductor

The coil conductor 16 described above includes a winding portion 20 formed by winding a conductive wire containing a conductive material into a coil shape, a first extended portion 22*a* extended to one side of the winding portion 20, and a second extended portion 22*b* extended to the other side of the winding portion 20.

The winding portion 20 is formed by winding in two stages. The coil conductor 16 is formed by winding a rectangular conductive wire into an α-winding shape. For example, the dimension of the rectangular conductive wire in the width direction y is equal to or more than 15 μm and equal to or less than 200 μm (i.e., from 15 μm to 200 μm), and the dimension thereof in the pressurization direction x is equal to or more than 50 μm and equal to or less than 500 μm (i.e., from 50 μm to 500 μm).

The first extended portion 22*a* is exposed from the first end surface 12*e* of the element body 12 to form a first exposed portion 24*a*, and the second extended portion 22*b* is exposed from the second end surface 12*f* of the element body 12 to form a second exposed portion 24*b*. In the first exposed portion 24*a*, an exposed surface of the first extended portion 22*a* is formed so as to intersect an extending direction of the first extended portion 22*a*. Further, in the second exposed portion 24*b*, the exposed surface of the second extended portion 22*b* is formed so as to intersect the extending direction of the second extended portion 22*b*.

The coil conductor 16 is formed of a conductive wire such as a metal wire or a wire. The conductive material of the coil conductor 16 is not particularly limited, but is, for example, a metal component made of Ag, Au, Cu, Ni, Sn, or an alloy thereof. Preferably, the conductive material is copper. Only one or two or more types of conductive materials may be used.

As illustrated in FIG. 5B, the coil conductor 16 is made of a plurality of crystal grains 17. An average crystal grain size a of the crystal grains 17 constituting the coil conductor 16 is preferably more than 2 μm and equal to or less than 10 μm (i.e., from 2 μm to 10 μm).

The average crystal grain size a of the crystal grains 17 constituting the coil conductor 16 is defined as an average value of equivalent circle diameters of the respective crystal grains 17 obtained by observing each coil conductor 16 cross-sectional fabricated by a focused ion beam (FIB) or cross-section ion milling (CP: Cross-section Polisher) at a magnification of 1000 times or more with a transmission electron microscope (TEM: Tunneling Electron Microscope) or a scanning electron microscope (SEM) and selecting 10 or more crystal grains 17.

The cross section described above is a cross section of the coil conductor 16 in the vicinity of a connection portion with the external electrode 40. A cross section extending over both of the coil conductor 16 and the external electrode 40 is more preferable.

The vicinity of the surface of the coil conductor 16 is excluded from the measurement target because there is a possibility that the shapes of the crystal grains are deformed.

The surface of the conductive wire constituting the coil conductor 16 is coated with an insulating material to form an insulating film 18. By coating the conductive wire constituting the coil conductor 16 with an insulating material, it is possible to more reliably insulate the wound coil conductor 16 from each other and insulate the coil conductor 16 from the magnetic portion 14.

Note that the insulating film 18 is not formed on each of the first exposed portion 24*a* and the second exposed portion 24*b* of the conductive wire constituting the coil conductor 16. Therefore, it is easy to form a first base electrode layer 42*a* and a second base electrode layer 42*b* as a plating layer by plating. In addition, since the coil conductor 16 and the first base electrode layer 42*a* and the second base electrode layer 42*b* can be connected to each other over wide areas, the electric resistance can be further reduced and the bonding strength can be further improved.

The insulating material of the insulating film 18 is not particularly limited, and examples thereof include polyurethane resin, polyester resin, epoxy resin, polyamide-imide resin, and polyimide resin. Preferably, the insulating film 18 is made of a polyamide-imide resin as an example.

The thickness of the insulating film 18 is preferably equal to or more than 2 μm and equal to or less than 10 μm (i.e., from 2 μm to 10 μm).

As illustrated in FIG. 5B, each of a plurality of concave portions 28 is formed in a surface 26*a*1 on the first main surface 12*a* side and a surface 26*a*2 on the second main surface 12*b* side of the first extended portion 22*a* of the conductive wire constituting the coil conductor 16. Metal magnetic particles 15 and the insulating film 18 are arranged in the concave portions 28. Alternatively, only the metal magnetic particles 15 are arranged in the concave portions 28. At this time, when the metal magnetic particles 15 are arranged in the concave portions 28, the metal magnetic particles 15 may penetrate the insulating film 18 formed on the surface 26*a*1 on the first main surface 12*a* side and the surface 26*a*2 on the second main surface 12*b* side of the first extended portion 22*a*, but preferably do not penetrate the insulating film 18.

Similarly, each of the plurality of concave portions 28 is formed in a surface 26*b*1 of the first main surface 12*a* and a surface 26*b*2 on the second main surface side of the second extended portion 22*b* of the conductive wire constituting the coil conductor 16. The metal magnetic particles 15 and the insulating film 18 are arranged in the concave portions 28. Alternatively, only the metal magnetic particles 15 are arranged in the concave portions 28. At this time, when the metal magnetic particles 15 are arranged in the concave portions 28, the metal magnetic particles 15 may penetrate the insulating film 18 formed on the surface **26*b*1 on the first main surface 12*a* side and the surface 26*b*2 on the second main surface 12*b* side of the second extended portion 22*b*, but preferably do not penetrate the insulating film 18**.

In addition, the insulating film 18 is not arranged on the exposed portions (exposed surfaces) of the first exposed portion **24*a* and the second exposed portion 24*b* of the coil conductor 16 at both the end surfaces 12*e* and 12*f* of the element body 12. As such, the coil conductor 16 can be directly electrically connected to the first base electrode layer 42*a* and the second base electrode layer 42*b*, so that electric resistance between the coil conductor 16 and the first base electrode layer 42*a* and the second base electrode layer 42*b*** can be reduced.

Furthermore, in the metal magnetic particles 15 in contact with the external electrode 40, the average thickness of the insulating coating in contact with the external electrode 40 is preferably smaller than the average thickness of the insulating coating not in contact with the external electrode 40. Accordingly, when the external electrode 40 is formed by plating, the metal magnetic particles 15 located around the first extended portion **22*a* and the second extended portion 22*b* of the coil conductor 16 exposed at the first end surface 12*e* and the second end surface 12*f* of the element body 12** can be intensively energized to allow plating growth.

Note that the structure around the exposed surface of the extended portion of the coil conductor 16 that is exposed on the surface of the element body 12 may be configured as described below.

Figure 6:
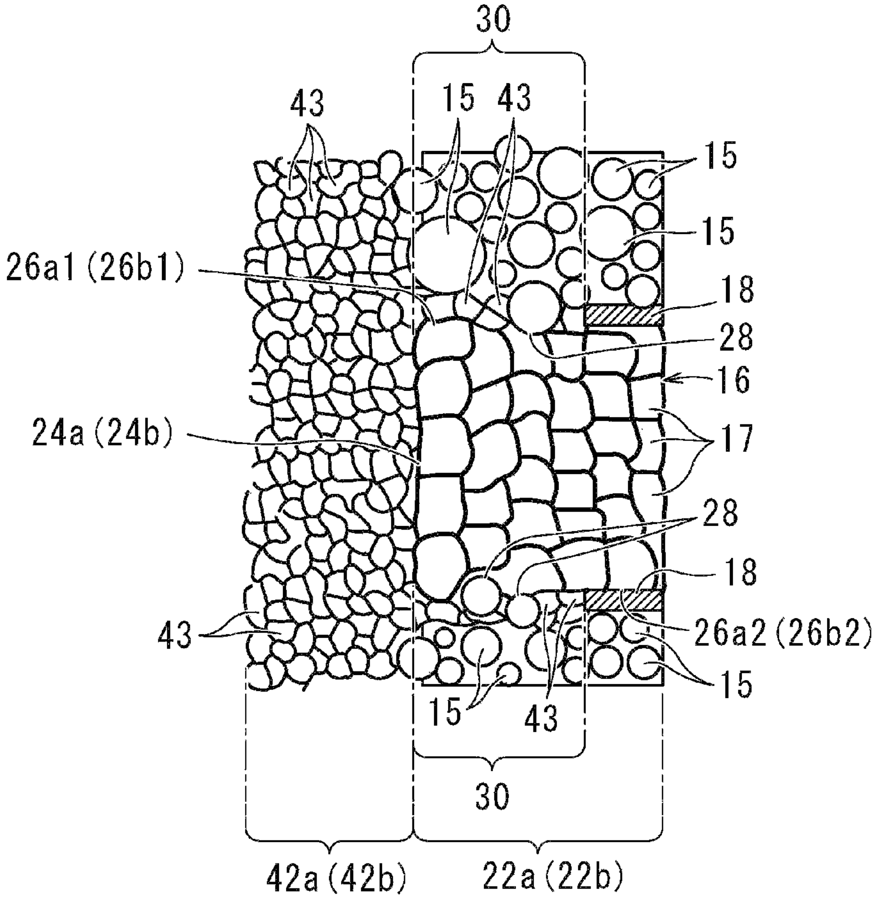
FIG. 6 is an enlarged cross-sectional view illustrating a first modification of the structure around an extended portion of the coil conductor.

FIG. 6 is an enlarged cross-sectional view illustrating a first modification of the structure around the extended portion of the coil conductor 16.

As illustrated in FIG. 6, in the first extended portion **22*a* and the second extended portion 22*b* of the coil conductor 16, an insulating film removed portion 30 not having the insulating film 18 is formed toward both the end surfaces 12*e* and 12*f* of the element body 12. Each of the plurality of concave portions 28 is formed in the surface 26*a*1 on the first main surface 12*a* side and the surface 26*a*2 on the second main surface 12*b* side of the first extended portion 22*a* of the coil conductor 16, and the metal magnetic particles 15 are arranged in the concave portions 28. Similarly, each of the plurality of concave portions 28 is formed in the surface 26*b*1 on the first main surface 12*a* side and the surface 26*b*2 on the second main surface 12*b* side of the second extended portion 22*b* of the coil conductor 16, and the metal magnetic particles 15 are arranged in the concave portions 28. Therefore, in the insulating film removed portion 30, the metal magnetic particles 15 are directly arranged in the concave portions 28 without penetrating the insulating film 18**.

As described above, since the insulating film 18 acts as a cushion when the concave portions 28 are formed in the surface of the coil conductor 16 by the metal magnetic particles 15, the insulating film 18 acts in a direction in which formation of the concave portions 28 is inhibited, but the concave portions 28 can be easily formed in the surface of the coil conductor 16 by removing the insulating film 18.

In addition, a part of the external electrode 40 is preferably arranged in the insulating film removed portion 30. Accordingly, since the coil conductor 16 and the external electrode 40 can be connected to each other over a wide area, it is possible to further reduce the electric resistance and to further improve the bonding strength.

Figure 7:
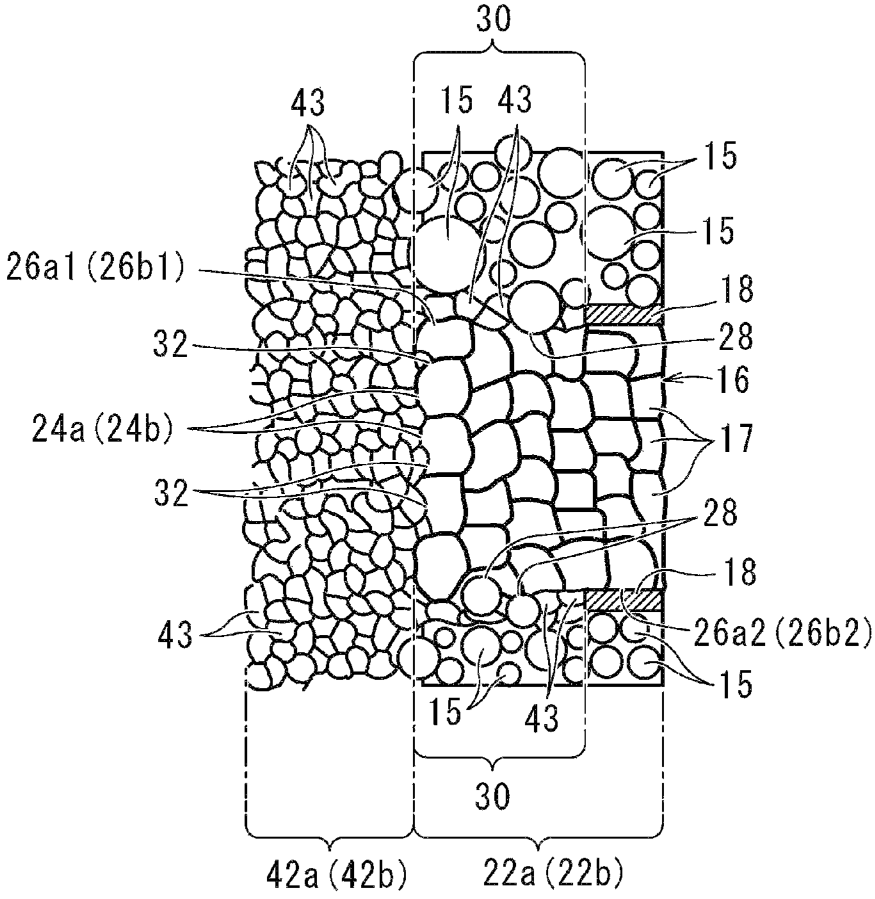
FIG. 7 is an enlarged cross-sectional view illustrating a second modification of the structure around the extended portion of the coil conductor.

FIG. 7 is an enlarged cross-sectional view illustrating a second modification of the structure around the extended portion of the coil conductor 16.

In the second modification around the extended portion of the coil conductor 16, as illustrated in FIG. 7, in the first extended portion **22*a* and the second extended portion 22*b* of the coil conductor 16, the insulating film removed portion 30 not having the insulating film 18 is formed toward both the end surfaces 12*e* and 12*f* of the element body 12, similarly to the first modification of the structure around the extended portion of the coil conductor 16. Further, a minute uneven portion 32 is formed on surfaces of exposed portions of the first exposed portion 24*a* and the second exposed portion 24*b* of the coil conductor 16 on both the end surfaces 12*e* and 12*f* of the element body 12. As such, since the contact surface area between the coil conductor 16 and the external electrode 40 can be increased, the bonding strength between the coil conductor 16 and the external electrode 40** can be further improved.

Figure 8:
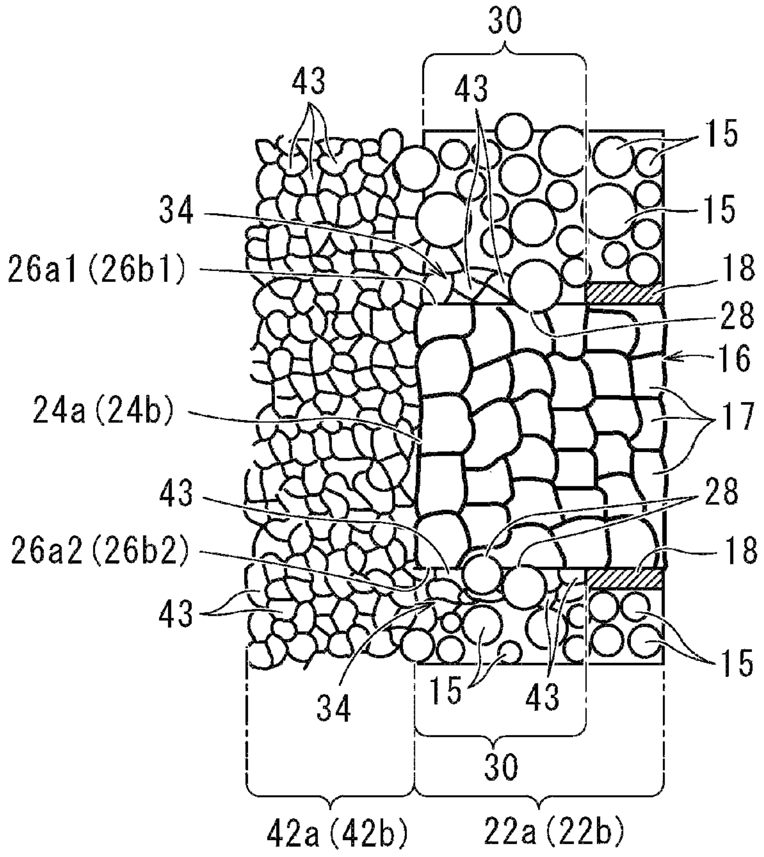
FIG. 8 is an enlarged cross-sectional view illustrating a third modification of the structure around the extended portion of the coil conductor.

FIG. 8 is an enlarged cross-sectional view illustrating a third modification of the structure around the extended portion of the coil conductor 16.

In the third modification around the extended portion of the coil conductor 16, as illustrated in FIG. 8, the insulating film removed portion 30 not having the insulating film 18 is formed in the first extended portion **22*a* and the second extended portion 22*b* of the coil conductor 16 toward both the end surfaces 12*e* and 12*f* of the element body 12, similarly to the first modification of the structure around the extended portion of the coil conductor 16. Further, a recessed portion 34 is formed in the element body 12 around the exposed portions of the first exposed portion 24*a* and the second exposed portion 24*b* of the coil conductor 16 on both the end surfaces 12*e* and 12*f* of the element body 12. The recessed portion 34 is formed such that an average distance between the coil conductor 16 and the magnetic portion 14 increase toward the direction in which the first extended portion 22*a* and the second extended portion 22*b* of the coil conductor 16 are extended to both the end surfaces 12*e* and 12*f*. Accordingly, the external electrode 40 can be arranged so as to fill the recessed portion 34 formed in the peripheral portions of the exposed portions of the first exposed portion 24*a* and the second exposed portion 24*b* of the coil conductor 16 on both the end surfaces 12*e* and 12*f* of the element body 12, therefore, the bonding strength between the coil conductor 16 and the external electrode 40** can be further improved.

Figure 9A:
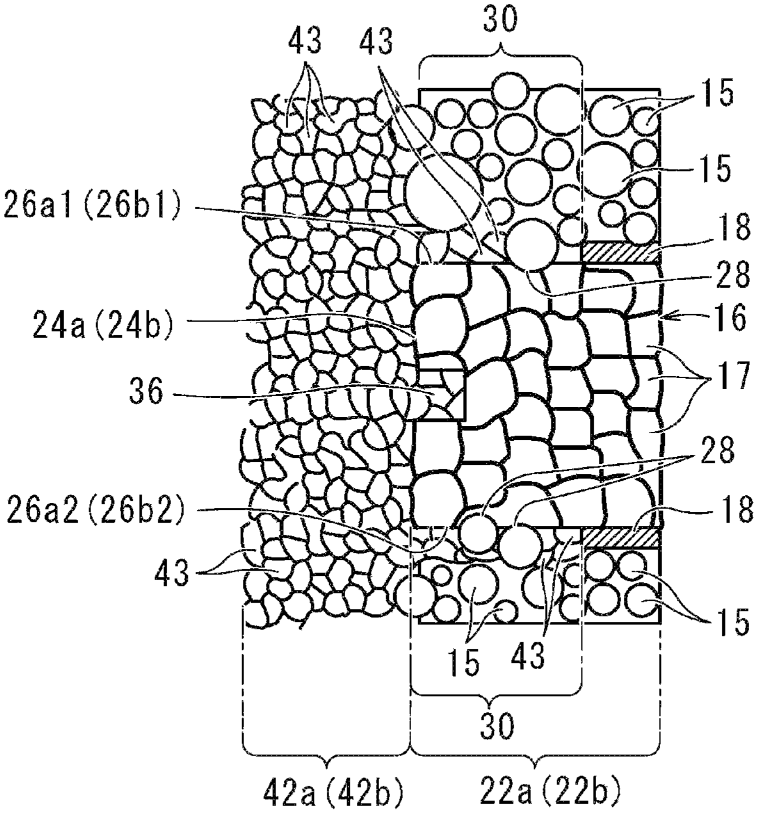
FIG. 9A is an enlarged cross-sectional view illustrating a fourth modification of the structure around the extended portion of the coil conductor.
Figure 9B:
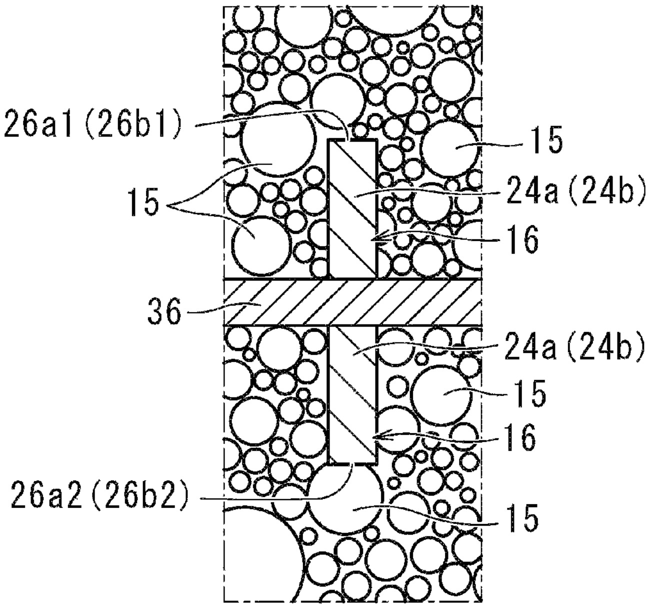
FIG. 9B is an enlarged view illustrating the fourth modification of the structure around the extended portion of the coil conductor viewed from an end surface side of an element body, excluding an external electrode.

FIG. 9 is an enlarged cross-sectional view illustrating a fourth modification of the structure around the extended portion of the coil conductor 16.

In the fourth modification around the extended portion of the coil conductor 16, as illustrated in FIG. 9, the insulating film removed portion 30 not having the insulating film 18 is formed in the first extended portion **22*a* and the second extended portion 22*b* of the coil conductor 16 toward both the end surfaces 12*e* and 12*f* of the element body 12, similarly to the first modification of the structure around the extended portion of the coil conductor 16. Further, a groove portion 36 having a predetermined width in the width direction y is formed at a central portion in the pressurization direction x of both the end surfaces 12*e* and 12*f* of the element body 12 and surfaces (exposed surfaces) of exposed portions of the first exposed portion 24*a* and the second exposed portion 24*b* of the coil conductor 16 exposed on both the end surfaces 12*e* and 12*f* of the element body 12. The depth of the groove portion 36 with respect to the element body 12 is preferably equal to or more than 5 μm and equal to or less than 100 μm (i.e., from 5 μm to 100 μm). Accordingly, the external electrode 40 can be arranged so as to fill the groove portion 36** formed in both the end surfaces 12*e* and 12*f* of the element body 12 and the surfaces (exposed surfaces) of the exposed portions of the first exposed portion 24*a* and the second exposed portion 24*b* of the coil conductor 16 exposed on both the end surfaces 12*e* and 12*f* of the element body 12, and thus the bonding strength between the coil conductor 16 and the external electrode 40 can be further improved.

(D) External Electrode

The external electrode 40 is arranged on the first end surface 12*e* side and the second end surface 12*f* side of the element body 12. The external electrode 40 includes a first external electrode 40*a* and a second external electrode 40*b*.

The first external electrode 40*a* is arranged on the surface of the first end surface 12*e* of the element body 12. Note that the first external electrode 40*a* may be formed so as to extend from the first end surface 12*e* and cover a part of each of the first main surface 12*a*, the second main surface 12*b*, the first side surface 12*c*, and the second side surface 12*d*, or may be extended from the first end surface 12*e* to the second main surface 12*b* and formed so as to cover a part of each of the first end surface 12*e* and the second main surface 12*b*. In this case, the first external electrode 40*a* is electrically connected to the first extended portion 22*a* of the coil conductor 16.

The second external electrode 40*b* is arranged on the surface of the second end surface 12*f* of the element body 12. Note that the second external electrode 40*b* may be formed so as to extend from the second end surface 12*f* and cover a part of each of the first main surface 12*a*, the second main surface 12*b*, the first side surface 12*c*, and the second side surface 12*d*, or may be extended from the second end surface 12*f* to the second main surface 12*b* and formed so as to cover a part of each of the second end surface 12*f* and the second main surface 12*b*. In this case, the second external electrode 40*b* is electrically connected to the second extended portion 22*b* of the coil conductor 16.

The thickness of each of the first external electrode 40*a* and the second external electrode 40*b* is not particularly limited, but may be, for example, equal to or more than 1 μm and equal to or less than 50 μm (i.e., from 1 μm to 50 μm), and preferably equal to or more than 5 μm and equal to or less than 20 μm (i.e., from 5 μm to 20 μm).

The first external electrode 40*a* includes the first base electrode layer 42*a* and a first plating layer 44*a* arranged on the surface of the first base electrode layer 42*a*. Similarly, the second external electrode 40*b* includes the second base electrode layer 42*b* and a second plating layer 44*b* arranged on the surface of the second base electrode layer 42*b*.

The first base electrode layer 42*a* is arranged on the surface of the first end surface 12*e* of the element body 12. Therefore, the first base electrode layer 42*a* is in direct contact with the first exposed portion 24*a* of the coil conductor 16. Note that the first base electrode layer 42*a* may be formed so as to extend from the first end surface 12*e* and cover a part of each of the first main surface 12*a*, the second main surface 12*b*, the first side surface 12*c*, and the second side surface 12*d*, or may be formed so as to extend from the first end surface 12*e* and cover a part of each of the first end surface 12*e* and the second main surface 12*b*.

In addition, the second base electrode layer 42*b* is arranged on the surface of the second end surface 12*f* of the element body 12. Therefore, the second base electrode layer 42*b* is in direct contact with the second exposed portion 24*b* of the coil conductor 16. Note that the second base electrode layer 42*b* may be formed so as to extend from the second end surface 12*f* and cover a part of each of the first main surface 12*a*, the second main surface 12*b*, the first side surface 12*c*, and the second side surface 12*d*, or may be formed so as to extend from the second end surface 12*f* and cover a part of each of the second end surface 12*f* and the second main surface 12*b*.

The first base electrode layer 42*a* and the second base electrode layer 42*b* are made of a conductive material, preferably one or more metal materials selected from Au, Ag, Pd, Ni, and Cu. The first base electrode layer 42*a* and the second base electrode layer 42*b* each are formed as a plated electrode. The first base electrode layer 42*a* and the second base electrode layer 42*b* may be formed by electrolytic plating or electroless plating.

In addition, the main component of the metal material constituting the first base electrode layer 42*a* and the second base electrode layer 42*b* and the main component of the metal material constituting the coil conductor 16 preferably have the same composition. As such, the metal coupling between the coil conductor 16 and the first base electrode layer 42*a* and the second base electrode layer 42*b* is further stronger, so that the bonding strength is increased and the DC resistance can be reduced.

The average thicknesses of the first base electrode layer 42*a* and the second base electrode layer 42*b* are, for example, 10 μm.

The first base electrode layer 42*a* and the second base electrode layer 42*b* are composed of a plurality of crystal grains 43. An average crystal grain size b of the crystal grains 43 constituting the first base electrode layer 42*a* and the second base electrode layer 42*b* is preferably equal to or more than 100 nm and equal to or less than 2000 nm (i.e., from 100 nm to 2000 nm), more preferably equal to or more than 100 nm and equal to or less than 1000 nm (i.e., from 100 nm to 1000 nm), and still more preferably equal to or more than 100 nm and equal to or less than 500 nm (i.e., from 100 nm to 500 nm).

The average crystal grain size b of the crystal grains 43 constituting the first base electrode layer 42*a* and the second base electrode layer 42*b* is defined as an average value of equivalent circle diameters of the respective crystal grains 43 obtained by observing each of the first base electrode layer 42*a* and the second base electrode layer 42*b* cross-sectional fabricated by a focused ion beam (FIB) or a cross-section ion milling (CP: Cross-section Polisher) at a magnification of 1000 times or more with a tunneling electron microscope (TEM) or a scanning electron microscope (SEM) and selecting 10 or more crystal grains 43.

The cross section described above is a cross section of the base electrode layers 42*a* and 42*b* in the vicinity of the connection portion with the coil conductor 16. A cross section extending over both of the base electrode layers 42*a* and 42*b* and the coil conductor 16 is more preferable.

The vicinity of the surfaces of the base electrode layers 42*a* and 42*b* is excluded from the measurement target because there is a possibility that the shapes of the crystal grains are deformed.

The average crystal grain size a of the crystal grains 15 constituting the coil conductor 16 and the average crystal grain size b of the crystal grains 43 constituting the first base electrode layer 42*a* and the second base electrode layer 42*b* satisfy the relationship of $a>b$. More preferably, the average crystal grain size a of the crystal grains 17 constituting the coil conductor 16 and the average crystal grain size b of the crystal grains 43 constituting the first base electrode layer 42*a* and the second base electrode layer 42*b* satisfy the relationship of $0.5 \geq b/a$.

The first plating layer 44*a* is arranged so as to cover the first base electrode layer 42*a*. To be specific, the first plating layer 44*a* may be arranged so as to cover the first base electrode layer 42*a* arranged on the first end surface 12*e*, further extend from the first end surface 12*e*, and arranged so as to cover the surface of the first base electrode layer 42*a* arranged on the first main surface 12*a*, the second main surface 12*b*, the first side surface 12*c*, and the second side surface 12*d*, or may be arranged so as to cover the first base electrode layer 42*a* extending from the first end surface 12*e* and arranged so as to cover a part of the second main surface 12*b*.

The second plating layer 44*b* is arranged so as to cover the second base electrode layer 42*b*. To be specific, the second plating layer 44*b* may be arranged so as to cover the second base electrode layer 42*b* arranged on the second end surface 12*f*, further extend from the second end surface 12*f*, and arranged so as to cover the surface of the second base electrode layer 42*b* arranged on the first main surface 12*a*, the second main surface 12*b*, the first side surface 12*c*, and the second side surface 12*d*, or may be arranged so as to cover the second base electrode layer 42*b* extending from the second end surface 12*f* and arranged so as to cover a part of the second main surface 12*b*.

The metal material of the first plating layer 44*a* and the second plating layer 44*b* includes, for example, at least one selected from the group consisting of Cu, Ni, Ag, Sn, Pd, Ag—Pd alloys, Au, and the like.

The first plating layer 44*a* and the second plating layer 44*b* may be formed in a plurality of layers.

The first plating layer 44*a* has a two-layer structure including a first Ni-plating layer 46*a* and a first Sn-plating layer 48*a* formed on the surface of the first Ni-plating layer 46*a*. The second plating layer 44*b* has a two-layer structure including a second Ni-plating layer 46*b* and a second Sn-plating layer 48*b* formed on the surface of the second Ni-plating layer 46*b*.

The average thickness of the first Ni-plating layer 46*a* and the second Ni-plating layer 46*b* is, for example, 5 μm.

In addition, the average thickness of the first Sn-plating layer 48*a* and the second Sn-plating layer 48*b* is, for example, 10 μm.

Note that the first external electrode 40*a* and the second external electrode 40*b* may be provided with the following configuration.

For example, the first base electrode layer 42*a* and the second base electrode layer 42*b* may be an Ag-containing resin electrode, or may be formed of an Ag sputtering layer, a Cu sputtering layer, or a Ti sputtering layer by sputtering. Note that when the first base electrode layer 42*a* and the second base electrode layer 42*b* are made of the Ag-containing resin electrode, glass frits may be contained. In addition, when the first base electrode layer 42*a* and the second base electrode layer 42*b* are formed by sputtering layers, a Cu sputtering layer may be formed on a Ti sputtering layer.

In addition, the outermost layers of the first plating layer 44*a* and the second plating layer 44*b* may be formed only by the Sn-plating layers 48*a* and 48*b*.

Alternatively, an Ag-plating layer or a Ni-plating layer may be formed on the element body 12 without forming the first base electrode layer 42*a* and the second base electrode layer 42*b*.

(E) Protection Layer

In this embodiment, a protection layer 50 is provided on the surface of the element body 12 excluding the first exposed portion 24*a* exposed on the first end surface 12*e* of the element body 12 and the second exposed portion 24*b* exposed on the second end surface 12*f*. The protection layer 50 is made of a resin material having a high electrical insulation property, such as an acrylic resin, an epoxy resin, a phenol resin, or a polyimide resin. Note that in the present disclosure, the protection layer 50 is provided, but the present disclosure is not limited thereto, and the protection layer 50 is not necessarily be provided.

When the dimension of the coil component 10 in the length direction z is defined as dimension L, the dimension L is preferably equal to or more than 1.0 mm and equal to or less than 12.0 mm (i.e., from 1.0 mm to 12.0 mm). When the dimension of the coil component 10 in the width direction y is defined as dimension W, the dimension W is preferably equal to or more than 0.5 mm and equal to or less than 12.0 mm (i.e., from 0.5 mm to 12.0 mm). When the dimension of the coil component 10 in the pressurization direction x is defined as dimension T, the dimension T is preferably equal to or more than 0.5 mm and equal to or less than 6.0 mm (i.e., from 0.5 mm to 6.0 mm).

According to the coil component 10 illustrated in FIG. 1, since the average crystal grain size a of the crystal grains 17 constituting the coil conductor 16 and the average crystal grain size b of the crystal grains 43 constituting the first base electrode layer 42*a* and the second base electrode layer 42*b* in direct contact with the coil conductor 16 satisfy the relationship of $a>b$, the arrangement is easily made such that the crystal grains 43 of the first base electrode layer 42*a* follow the shapes of the surfaces of the crystal grains 17 constituting the coil conductor 16 exposed on both the end surfaces 12*e* and 12*f*, thereby reducing the electric resistance between the coil conductor 16 and the first base electrode layer 42*a* and the second base electrode layer 42*b*. In addition, the bonding strength between the coil conductor 16 and the first base electrode layer 42*a* and the second base electrode layer 42*b* can be improved.

In addition, in the coil component 10 illustrated in FIG. 1, the average crystal grain size a of the crystal grains 17 constituting the coil conductor 16 and the average crystal grain size b of the crystal grains 43 constituting the first base electrode layer 42*a* and the second base electrode layer 42*b* satisfy the relationship of $0.5 \geq b/a$, whereby the crystal grains 43 of the first base electrode layer 42*a* can be arranged so as to follow the shapes of the surfaces of the crystal grains 17 constituting the coil conductor 16 exposed on both the end surfaces 12*e* and 12*f*, so that the coil conductor 16 and the first base electrode layer 42*a* and the second base electrode layer 42*b* can be connected without forming voids therebetween, and thus the bonding strength between the coil conductor 16 and the first base electrode layer 42*a* and the second base electrode layer 42*b* can be further improved and the electric resistance can be reduced.

Next, a first modification of the element body 12 of the coil component 10 of the embodiment of the present disclosure will be described.

Figure 10:
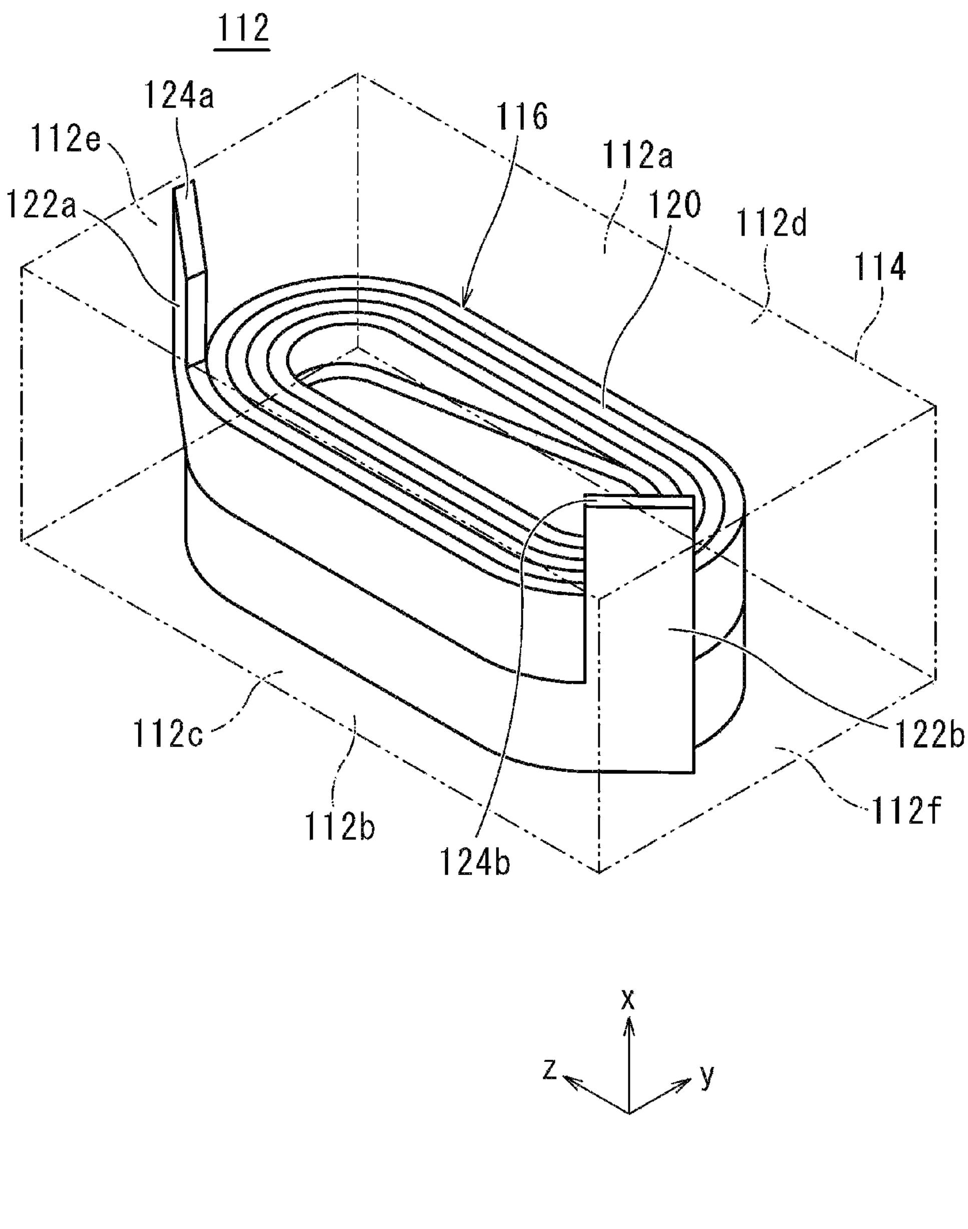
FIG. 10 is a transparent perspective view illustrating a first modification of the element body of the coil component of the embodiment of the present disclosure.

FIG. 10 is a transparent perspective view illustrating the first modification of the element body of the coil component of the embodiment of the present disclosure.

As illustrated in FIG. 10, an element body 112 according to the first modification includes a magnetic portion 114 and a coil conductor 116 embedded in the magnetic portion 114. The element body 112 has a first main surface 112*a* and a second main surface 112*b* opposite to each other in the height direction x, a first side surface 112*c* and a second side surface 112*d* opposite to each other in the width direction y orthogonal to the height direction x, and a first end surface 112*e* and a second end surface 112*f* opposite to each other in the length direction z orthogonal to the height direction x and the width direction y.

The coil conductor 116 includes a winding portion 120 formed by winding a conductive wire containing a conductive material into a coil shape, a first extended portion 122*a* extended to one side of the winding portion 120, and a second extended portion 122*b* extended to the other side of the winding portion 120.

The first extended portion 122*a* is extended and exposed on the first main surface 112*a* of the element body 112 to form a first exposed portion 124*a*, and the second extended portion 122*b* is exposed from the first main surface 112*a* of the element body 112 to form a second exposed portion 124*b*. In the first exposed portion 124*a*, an exposed surface of the first extended portion 122*a* is formed so as to intersect the extending direction of the first extended portion 122*a*. Further, in the second exposed portion 124*b*, the exposed surface of the second extended portion 122*b* is formed so as to intersect the extending direction of the second extended portion 122*b*.

The coil conductor 116 is formed by a conductive wire similar to that of the coil conductor 16, and a conductive material similar to that of the coil conductor 16 can be used. In addition, the coil conductor 116 is composed of a plurality of crystal grains. The average crystal grain size a of the crystal grains constituting the coil conductor 116 is preferably greater than 2 μm and equal to or less than 10 μm (i.e., from 2 μm to 10 μm).

As illustrated in FIG. 10, when the first extended portion 122*a* of the coil conductor 116 is exposed from the first main surface 112*a*, the first external electrode (not illustrated) is formed so as to cover a part of the first main surface 112*a*. In this case, the first external electrode is electrically connected to the first extended portion 122*a* of the coil conductor 116.

In addition, when the second extended portion 122*b* of the coil conductor 116 is exposed from the first main surface 112*a* as illustrated in FIG. 10, the second external electrode (not illustrated) is formed so as to cover a part of the first main surface 112*a*. In this case, the second external electrode is electrically connected to the second extended portion 122*b* of the coil conductor 116.

The first external electrode includes a first base electrode layer and a first plating layer arranged on a surface of the first base electrode layer. Similarly, the second external electrode includes a second base electrode layer and a second plating layer arranged on a surface of the second base electrode layer.

In the coil conductor 116, when the first extended portion 122*a* of the coil conductor 116 is exposed from the first main surface 112*a* as illustrated in FIG. 10, the first base electrode layer (not illustrated) is formed on a part of the first main surface 112*a* so as to cover the first extended portion 122*a* of the coil conductor 116.

In addition, when the second extended portion 122*b* of the coil conductor 116 is exposed from the first main surface 112*a* as illustrated in FIG. 10, the second base electrode layer (not illustrated) is formed on a part of the first main surface 112*a* so as to cover the second extended portion 122*b* of the coil conductor 116.

In this case, the first base electrode layer and the second base electrode layer are composed of a plurality of crystal grains. The average crystal grain size b of the crystal grains constituting the first base electrode layer and the second base electrode layer is preferably equal to or more than 100 nm and equal to or less than 2000 nm (i.e., from 100 nm to 2000 nm), more preferably equal to or more than 100 nm and equal to or less than 1000 nm (i.e., from 100 nm to 1000 nm), and still more preferably equal to or more than 100 nm and equal to or less than 500 nm (i.e., from 100 nm to 500 nm).

Further, when the first extended portion 122*a* of the coil conductor 116 is exposed from the first main surface 112*a* as illustrated in FIG. 10, the first plating layer (not illustrated) is formed so as to cover the first base electrode layer arranged on the first main surface 112*a*.

In addition, when the second extended portion 122*b* of the coil conductor 116 is exposed from the first main surface 112*a* as illustrated in FIG. 10, the second plating layer (not illustrated) is formed so as to cover the second base electrode layer arranged on the first main surface 112*a*.

Note that as for the structure around the exposed surface of the extended portion of the coil conductor 16 exposed on the surface of the element body 12, in FIG. 5 to FIG. 9, the configuration in which the extended portions 22*a* and 22*b* of the coil conductor 16 are extended and exposed on both the end surfaces 12*e* and 12*f* has been described, but the present disclosure is not limited thereto, and the structure around the exposed surfaces of the extended portions 122*a* and 122*b* exposed on the first main surface 112*a* side is also the same structure as illustrated in FIG. 10.

In addition, a second modification of the element body 12 of the coil component 10 of the embodiment of the present disclosure will be described.

Figure 11A:
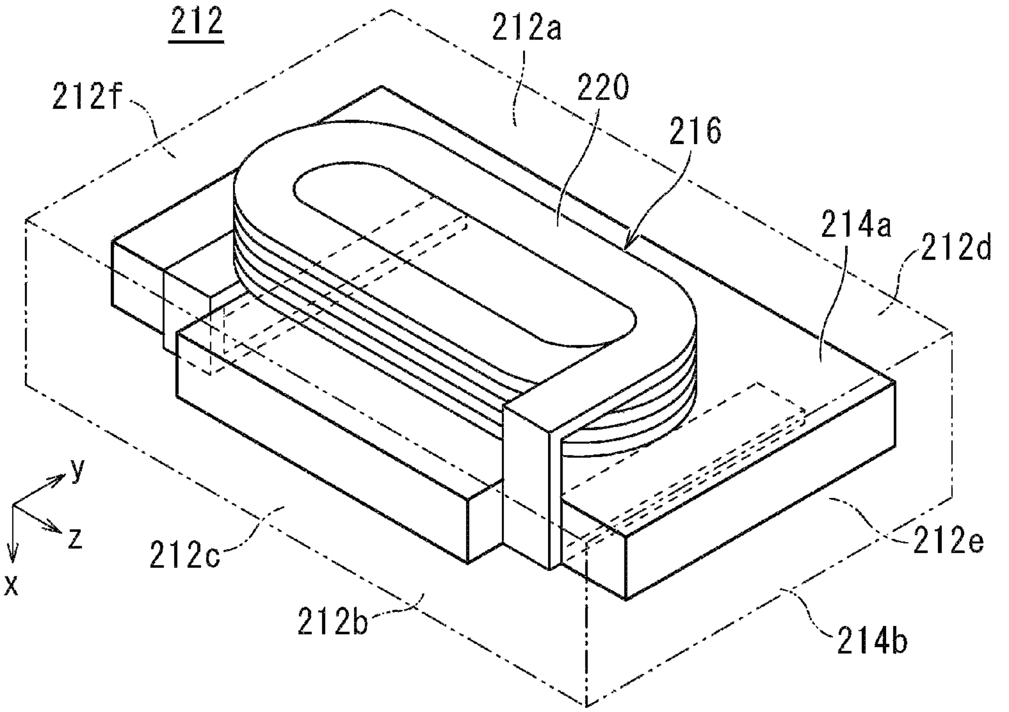
FIG. 11A is a transparent perspective view illustrating a second modification of the element body of the coil component of the embodiment of the present disclosure.
Figure 11B:
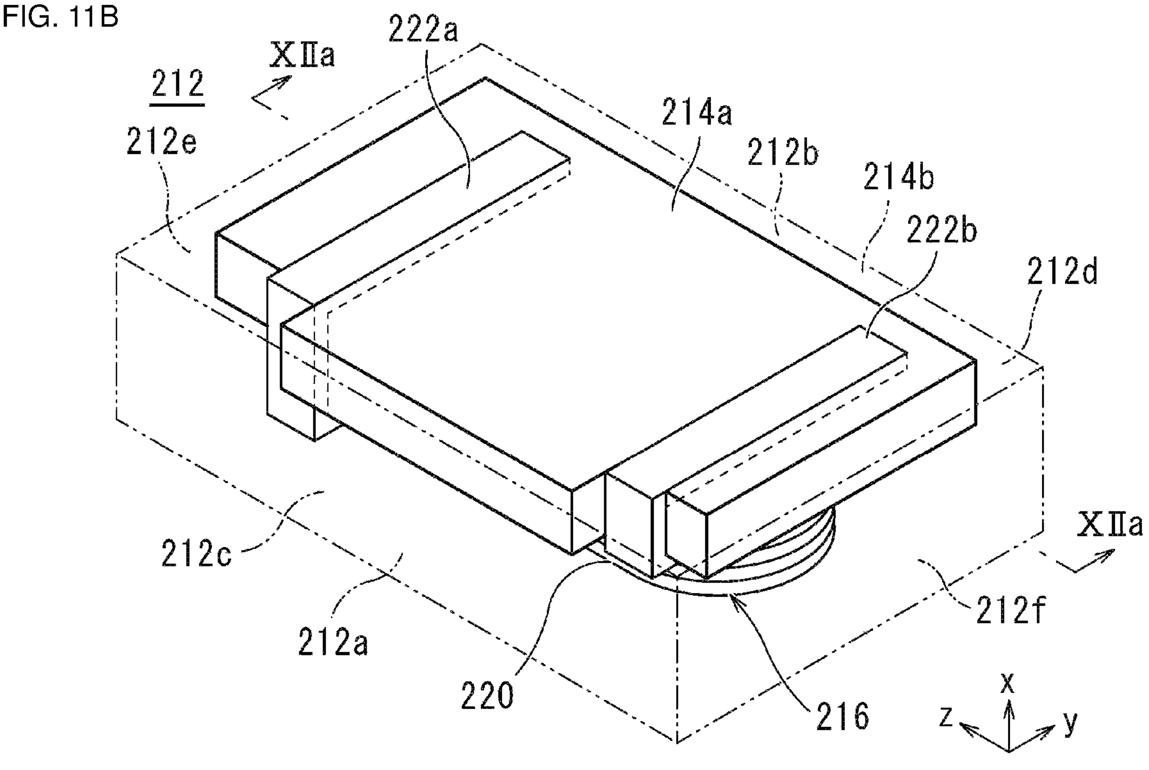
FIG. 11B is a transparent perspective view when viewed from a direction different from that of FIG. 11A except for a base electrode layer.
Figure 12A:
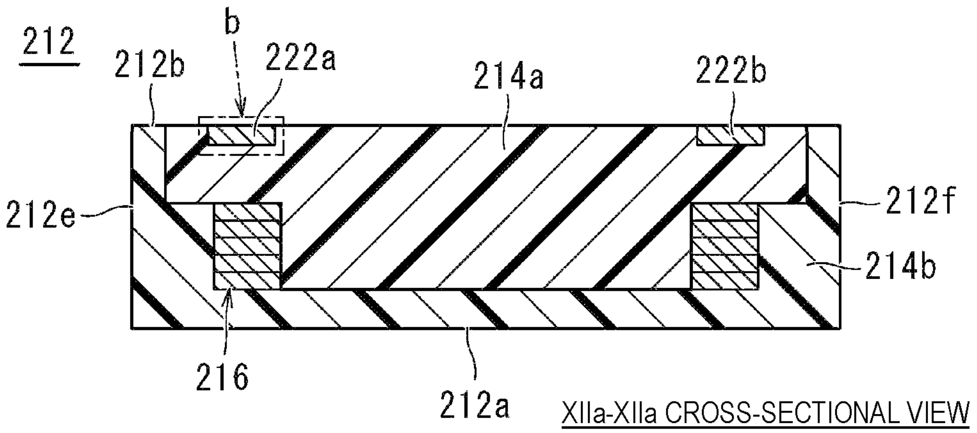
FIG. 12A is a cross-sectional view taken along line XIIa-XIIa of FIG. 11B illustrating a coil component according to the present disclosure.
Figure 12B:
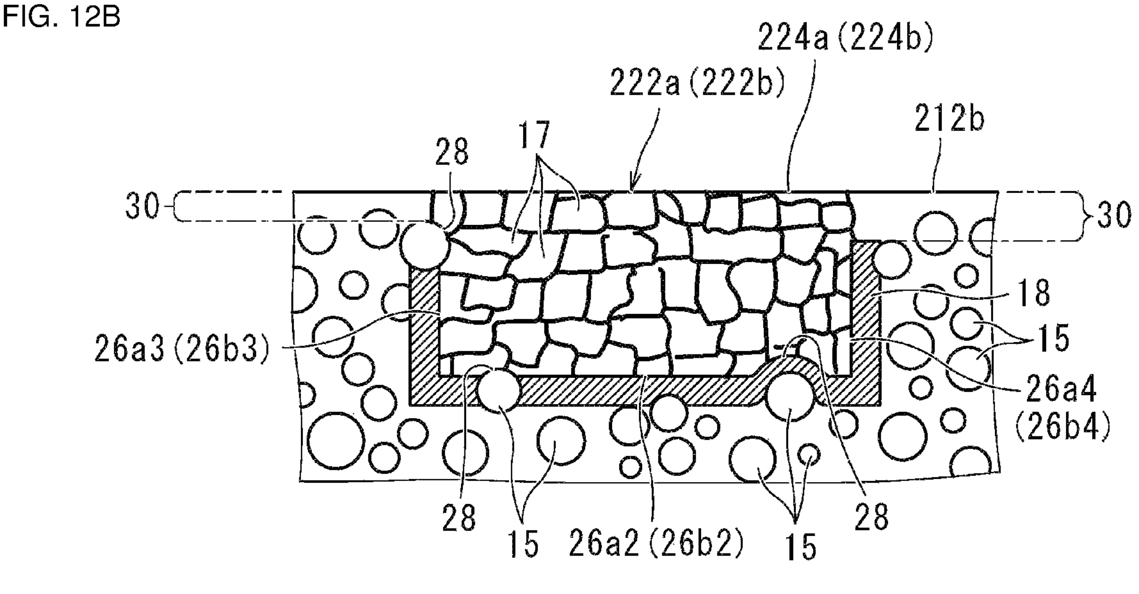
FIG. 12B is an enlarged cross-sectional view of a portion b.

FIG. 11A is a transparent perspective view illustrating the second modification of the element body of the coil component of the embodiment of the present disclosure, and FIG. 11B is a transparent perspective view when viewed from a direction different from that in FIG. 11A.

As illustrated in FIGS. 11A and 11B, an element body 212 according to the second modification includes a magnetic portion 214 and a coil conductor 216 embedded in the magnetic portion 214. The magnetic portion 214 includes a first magnetic portion 214*a* having a convex portion arranged in the magnetic core portion of the coil conductor 216 and a second magnetic portion 214*b* covering the first magnetic portion 214*a* and the coil conductor 216.

The element body 212 is formed in a substantially rectangular parallelepiped shape and has a first main surface 212*a* and a second main surface 212*b* opposite to each other in the height direction x, a first side surface 212*c* and a second side surface 212*d* opposite to each other in the width direction y orthogonal to the height direction x, and a first end surface 212*e* and a second end surface 212*f* opposite to each other in the length direction z orthogonal to the height direction x and the width direction y.

The coil conductor 216 includes a winding portion 220 arranged on one surface side of the first magnetic portion 214*a* and formed by winding a conductive wire containing a conductive material into a coil shape, a first extended portion 222*a* extended to one side of the winding portion 220, and a second extended portion 222*b* extended to the other side of the winding portion 220. The first extended portion 222*a* is extended to the first end surface 212*e* side of the second main surface 212*b* of the element body 212, and at least a part of the surface, among the surfaces of the first extended portion 222*a*, parallel to the extending direction of the first extended portion 222*a* is exposed from the second main surface 212*b* of the element body 212 to form a first exposed portion 224*a*. The second extended portion 222*b* is extended to the second end surface 212*f* side of the second main surface 212*b* of the element body 212, and at least a part of the surface, among the surfaces of the second extended portion 222*b*, parallel to the extending direction of the second extended portion 222*b* is exposed from the second main surface 212*b* of the element body 212 to form a second exposed portion 224*b*.

As described above, the first extended portion 222*a* may be subjected to forming and arranged on the second main surface 212*b* of the element body 212, and the second extended portion 222*b* is subjected to forming and arranged on the second main surface 212*b* of the element body 212. The second main surface 212*b* of the element body 212 may be a mounting surface.

A part of the surface of the first extended portion 222*a* extended to the second main surface 212*b* may be embedded in the element body 212, and the plurality of concave portions 28 may be formed in the surfaces of the first extended portion 222*a* embedded in the element body 212 in the second main surface 212*b*. The concave portions 28 are preferably formed in surfaces 26*a*3 and 26*a*4 of the first extended portion 222*a* arranged perpendicular to the second main surface 212*b*, and more preferably formed on the surfaces 26*a*3 and 26*a*4 of the first extended portion 222*a* arranged perpendicular to the second main surface 212*b* and on the surface 26*a*2 of the first extended portion 222*a* arranged parallel to the extending direction of the first extended portion 222*a*. The metal magnetic particles 15 and the insulating film 18 may be arranged in the concave portions 28. Alternatively, only the metal magnetic particles 15 may be arranged in the concave portions 28. At this time, when the metal magnetic particles 15 are arranged in the concave portions 28, the metal magnetic particles 15 may penetrate the insulating film 18 formed on the surfaces 26*a*2, 26*a*3, and 26*a*4 of the first extended portion 222*a*, but it is preferable that the metal magnetic particles 15 do not penetrate the insulating film 18.

The insulating film removed portion 30 not having the insulating film 18 may be formed on the surfaces 26*a*3 and 26*a*4 of the first extended portion 222*a* embedded in the element body 212 in the second main surface 212*b*, and the plurality of concave portions 28 may be formed in the surfaces 26*a*3 and 26*a*4 of the second extended portion 222*b* in the insulating film removed portion 30. Further, the metal magnetic particles 15 may be arranged in the concave portions 28.

As described above, when the metal magnetic particles 15 are arranged in the concave portions 28, peeling of the first extended portion 222*a* from the second main surface 212*b* is suppressed by the anchor effect.

Similarly, a part of the surface of the second extended portion 222*b* extended to the second main surface 212*b* may be embedded in the element body 212, and the plurality of concave portions 28 may be formed in the surfaces of the second extended portion 222*b* embedded in the element body 212 in the second main surface 212*b*. The concave portions 28 are preferably formed in surfaces 26*b*3 and 26*b*4 of the second extended portion 222*b* arranged perpendicular to the second main surface 212*b*, and more preferably formed in surfaces 26*b*3 and 26*b*4 of the first extended portion 222*a* arranged perpendicular to the second main surface 212*b* and on the surface 26*b*2 of the second extended portion 222*b* arranged parallel to the extending direction of the second extended portion 222*b*. The metal magnetic particles 15 and the insulating film 18 may be arranged in the concave portions 28. Alternatively, only the metal magnetic particles 15 may be arranged in the concave portions 28. At this time, when the metal magnetic particles 15 are arranged in the concave portions 28, the metal magnetic particles 15 may penetrate the insulating film 18 formed on the surfaces 26*b*2, 26*b*3, and 26*b*4 of the second extended portion 222*b*, but it is preferable that the metal magnetic particles 15 do not penetrate the insulating film 18.

The insulating film removed portion 30 not having the insulating film 18 may be formed on the surfaces 26*b*3 and 26*b*4 of the second extended portion 222*b* embedded in the element body 212 in the second main surface 212*b*, and the plurality of concave portions 28 may be formed in the surfaces 26*b*3 and 26*b*4 of the second extended portion 222*b* in the insulating film removed portion 30. Further, the metal magnetic particles 15 may be arranged in the concave portions 28.

As described above, when the metal magnetic particles 15 are arranged in the concave portions 28, peeling of the second extended portion 222*b* from the second main surface 212*b* is suppressed by the anchor effect.

The coil conductor 216 is formed by a conductive wire similar to that of the coil conductor 16, and a conductive material similar to that of the coil conductor 16 can be used. In addition, the coil conductor 216 is composed of a plurality of crystal grains. The average crystal grain size a of the crystal grains constituting the coil conductor 216 is preferably greater than 2 μm and equal to or less than 10 μm (i.e., from 2 μm to 10 μm).

As illustrated in FIG. 11, when the first extended portion 222*a* of the coil conductor 216 is subjected to forming and exposed from the second main surface 212*b*, the first external electrode (not illustrated) is formed so as to cover a part of the second main surface 212*b*. In this case, the first external electrode is electrically connected to the first extended portion 222*a* of the coil conductor 216.

In addition, as illustrated in FIG. 11, when the second extended portion 222*b* of the coil conductor 216 is subjected to forming and exposed from the second main surface 212*b*, the second external electrode (not illustrated) is formed so as to cover a part of the second main surface 212*b*. In this case, the second external electrode is electrically connected to the second extended portion 222*b* of the coil conductor 216.

The first external electrode includes a first base electrode layer and a first plating layer arranged on a surface of the first base electrode layer. Similarly, the second external electrode includes a second base electrode layer and a second plating layer arranged on a surface of the second base electrode layer.

In the coil conductor 216, when the first extended portion 222*a* of the coil conductor 216 is subjected to forming and exposed from the second main surface 212*b* as illustrated in FIG. 11, the first base electrode layer (not illustrated) is formed on a part of the second main surface 212*b* so as to cover the first extended portion 222*a* of the coil conductor 216.

In addition, when the second extended portion 222*b* of the coil conductor 216 is subjected to forming and exposed from the second main surface 212*b* as illustrated in FIG. 11, the second base electrode layer (not illustrated) is formed on a part of the second main surface 212*b* so as to cover the second extended portion 222*b* of the coil conductor 216.

In this case, the first base electrode layer and the second base electrode layer are composed of a plurality of crystal grains. The average crystal grain size b of the crystal grains constituting the first base electrode layer and the second base electrode layer is preferably equal to or more than 100 nm and equal to or less than 2000 nm (i.e., from 100 nm to 2000 nm), more preferably equal to or more than 100 nm and equal to or less than 1000 nm (i.e., from 100 nm to 1000 nm), and still more preferably equal to or more than 100 nm and equal to or more than 500 nm (i.e., from 100 nm to 500 nm).

Further, as illustrated in FIG. 11, when the first extended portion 222*a* of the coil conductor 216 is subjected to forming and directly extended to the second main surface 212*b*, although not illustrated, the first extended portion 222*a* may be formed so as to cover the first base electrode layer arranged on the second main surface 212*b*.

In addition, as illustrated in FIG. 11, when the second extended portion 222*b* of the coil conductor 216 is subjected to forming and directly extended to the second main surface 212*b*, although not illustrated, the second extended portion 222*b* may be formed so as to cover the second base electrode layer arranged on the second main surface 212*b*.

Note that as for the structure around the exposed surface of the extended portion of the coil conductor 16 exposed on the surface of the element body 12, in FIG. 5 to FIG. 9, the configuration in which the extended portions 22*a* and 22*b* of the coil conductor 16 are extended and exposed on both the end surfaces 12*e* and 12*f* has been described, but the present disclosure is not limited thereto, and the structure around the exposed surfaces of the extended portions 222*a* and 222*b* exposed on the second main surface 212*b* side is also the same structure as illustrated in FIG. 11.

Next, a coil component 510 of a second embodiment of the present disclosure will be described.

Figure 13:
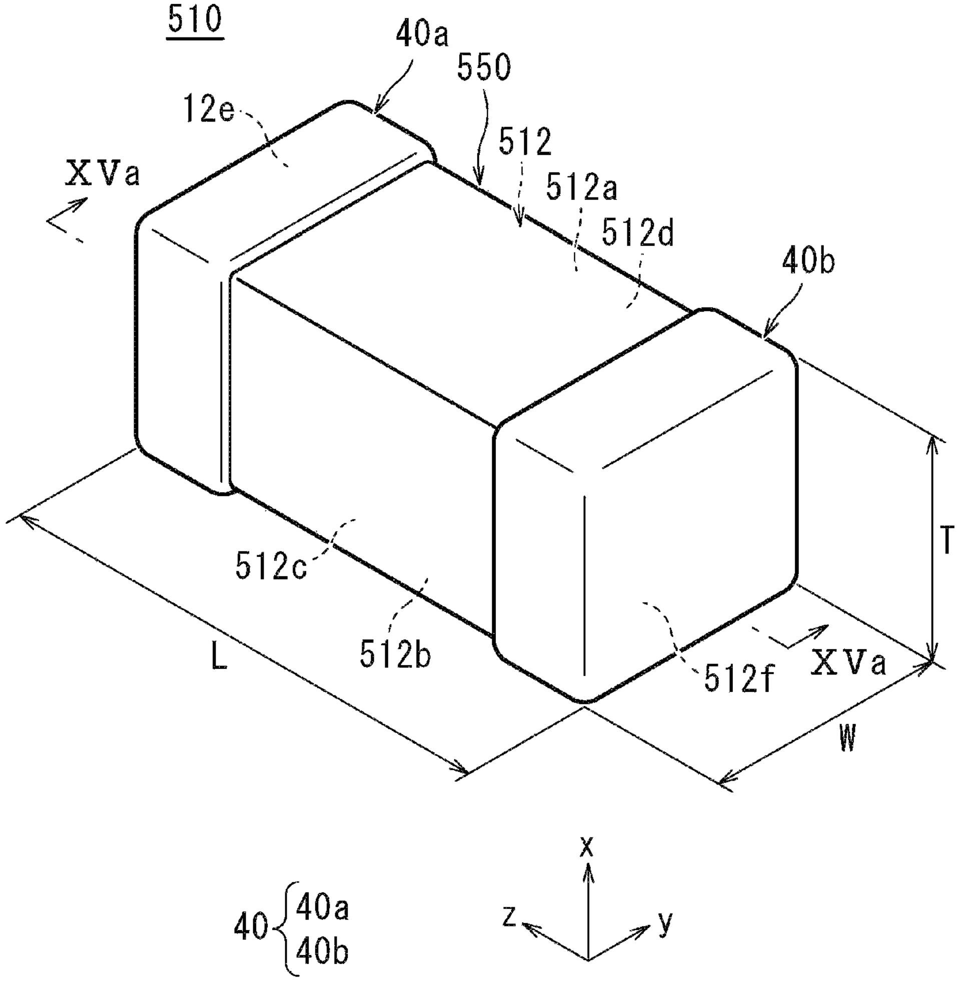
FIG. 13 is an external perspective view schematically illustrating a second embodiment of a coil component of the present disclosure.
Figure 14:
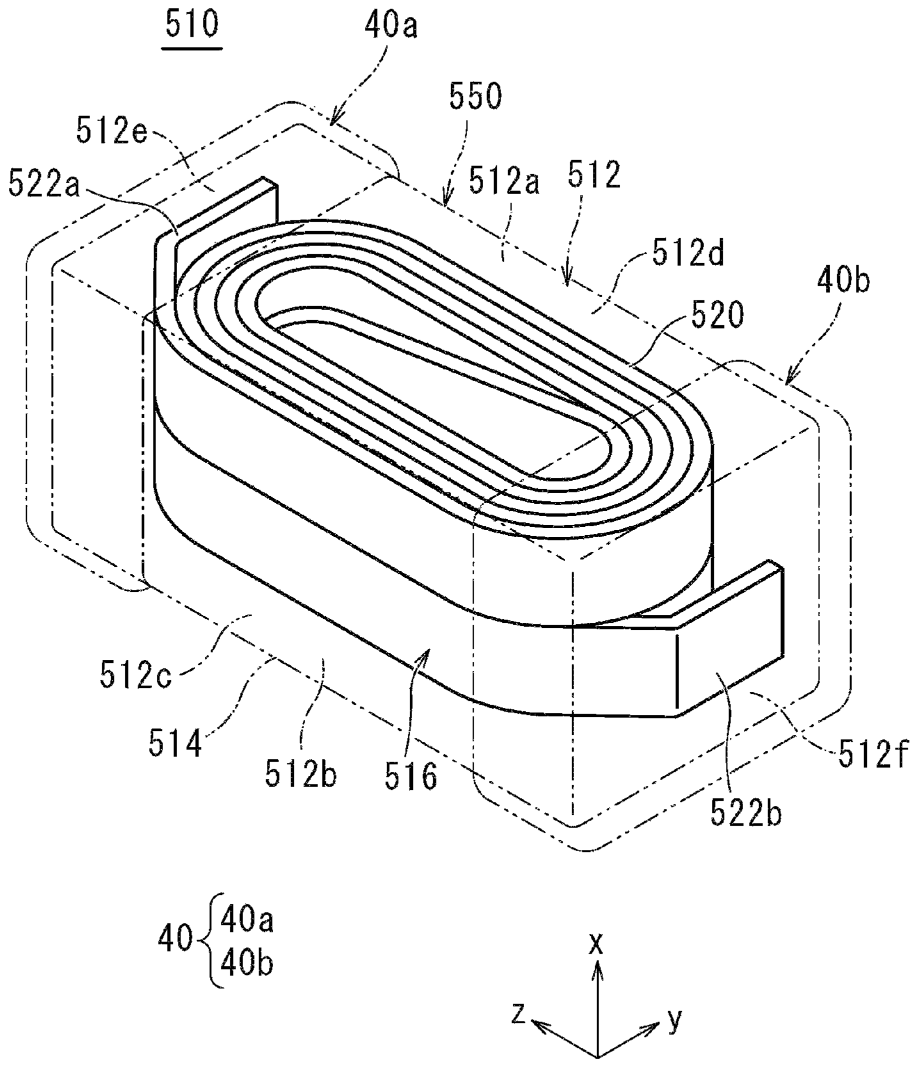
FIG. 14 is a transparent perspective view of a magnetic portion in which a coil conductor is embedded in the coil component illustrated in FIG. 13.
Figure 15A:
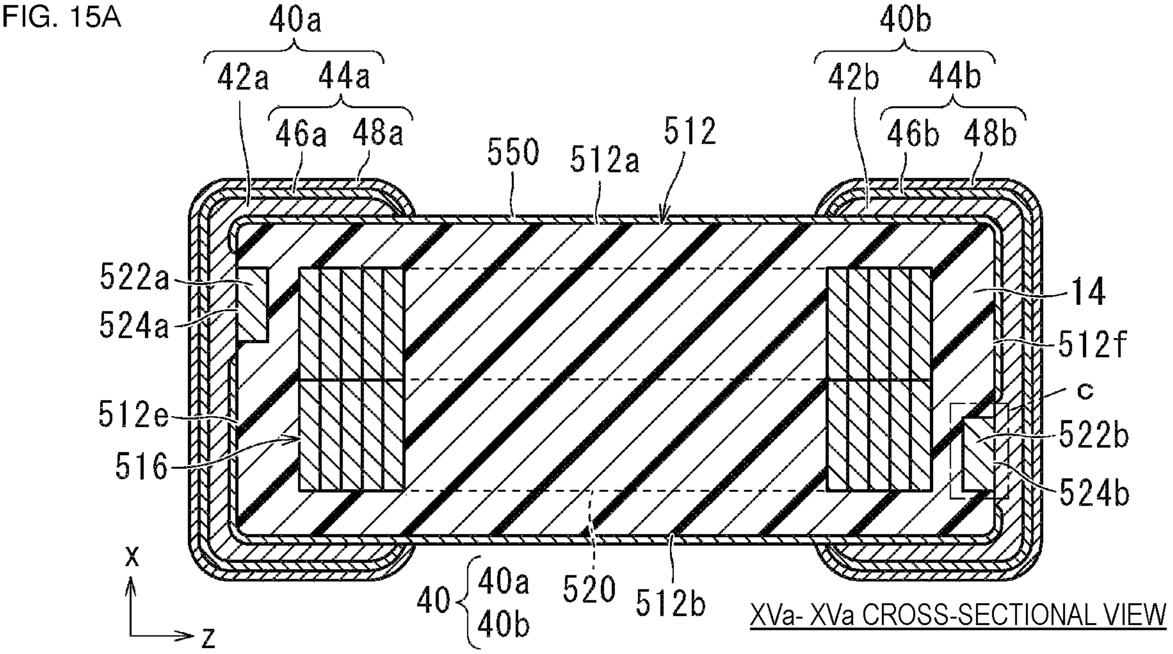
FIG. 15A is a cross-sectional view taken along line XVa-XVa of FIG. 14 illustrating the coil component according to the present disclosure.
Figure 15B:
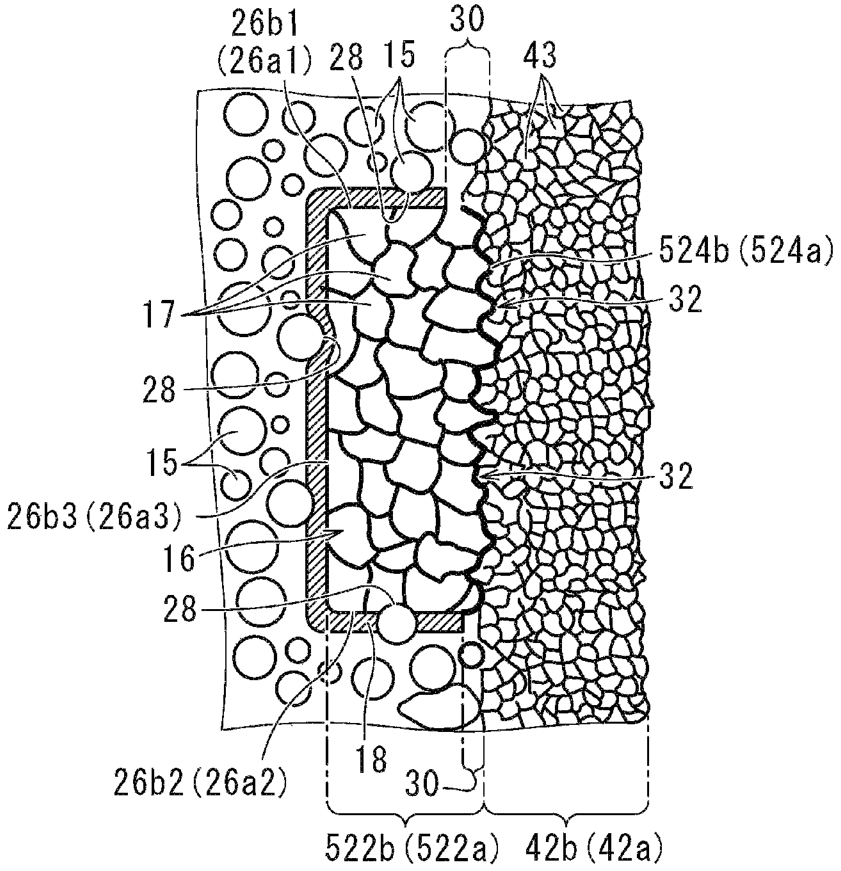
FIG. 15B is an enlarged cross-sectional view of a portion c.

FIG. 13 is an external perspective view schematically illustrating the second embodiment of the coil component of the present disclosure. FIG. 14 is a transparent perspective view of a magnetic portion in which a coil conductor is embedded in the coil component illustrated in FIG. 13. FIG. 15A is a cross-sectional view taken along line XVa-XVa of FIG. 13 illustrating the coil component according to the present disclosure, and FIG. 15B is an enlarged cross-sectional view of a portion c.

As illustrated in FIG. 14, the element body 512 includes a magnetic portion 514 and a coil conductor 516 embedded in the magnetic portion 514. The element body 512 has a first main surface 512*a* and a second main surface 512*b* opposite to each other in the height direction x, a first side surface 512*c* and a second side surface 512*d* opposite to each other in the width direction y orthogonal to the height direction x, and a first end surface 512*e* and a second end surface 512*f* opposite to each other in the length direction z orthogonal to the height direction x and the width direction y.

The coil conductor 516 includes a winding portion 520 formed by winding a conductive wire containing a conductive material into a coil shape, a first extended portion 522*a* extended to one side of the winding portion 520, and a second extended portion 522*b* extended to the other side of the winding portion 520.

The first extended portion 522*a* is exposed from the first end surface 512*e* of the element body 512 to form a first exposed portion 524*a*, and the second extended portion 522*b* is exposed from the second end surface 512*f* of the element body 512 to form a second exposed portion 524*b*. In the first exposed portion 524*a*, the exposed surface of the first extended portion 522*a* is arranged parallel to the extending direction of the first extended portion 522*a*. Further, in the second exposed portion 524*b*, the exposed surface of the second extended portion 522*b* is arranged parallel to the extending direction of the second extended portion 522*b*.

The coil conductor 516 is formed by a conductive wire similar to that of the coil conductor 16, and a conductive material similar to that of the coil conductor 16 can be used. In addition, the coil conductor 516 is composed of a plurality of crystal grains. The average crystal grain size a of the crystal grains constituting the coil conductor 516 is preferably greater than 2 μm and equal to or less than 10 μm (i.e., from 2 μm to 10 μm).

As illustrated in FIG. 14, when the first extended portion 522*a* of the coil conductor 516 is exposed from the first end surface 512*e*, the first external electrode 40*a* is arranged on the surface of the first end surface 512*e* of the element body 512. Note that the first external electrode 40*a* may be formed so as to extend from the first end surface 512*e* and cover a part of each of the first main surface 512*a*, the second main surface 512*b*, the first side surface 512*c*, and the second side surface 512*d*, or may be extended from the first end surface 512*e* to the second main surface 512*b* and formed so as to cover a part of each of the first end surface 512*e* and the second main surface 512*b*. In this case, a first external electrode 40*a* is electrically connected to the first extended portion 522*a* of the coil conductor 516.

In addition, as illustrated in FIG. 14, when the second extended portion 522*b* of the coil conductor 516 is exposed from the second end surface 512*f*, the second external electrode 40*b* is arranged on the surface of the second end surface 512*f* of the element body 512. Note that the second external electrode 40*b* may be formed so as to extend from the second end surface 512*f* and cover a part of each of the first main surface 512*a*, the second main surface 512*b*, the first side surface 512*c*, and the second side surface 512*d*, or may be extended from the second end surface 512*f* to the second main surface 512*b* and formed so as to cover a part of each of the second end surface 512*f* and the second main surface 512*b*. In this case, the second external electrode 40*b* is electrically connected to the second extended portions 522*b* of the coil conductor 516.

As illustrated in FIG. 15B, each of the plurality of concave portions 28 is formed in the surface 26*a*1 on the first main surface 512*a* side and the surfaces 26*a*2 on the second main surface 512*b* side of the first extended portion 522*a* of the conductive wire constituting the coil conductor 516. In addition, it is preferable that the concave portions 28 are formed in the surface 26*a*3 of the first extended portion 522*a* arranged perpendicularly to the second main surface 212*b*. The metal magnetic particles 15 and the insulating film 18 are arranged in the concave portions 28. Alternatively, only the metal magnetic particles 15 are arranged in the concave portions 28. At this time, when the metal magnetic particles 15 are arranged in the concave portions 28, the metal magnetic particles 15 may penetrate the insulating film 18 formed on the surface 26*a*1 on the first main surface 512*a* side and the surface 26*a*2 on the second main surface 512*b* side of the first extended portion 522*a*, and the surface 26*a*3 on the second end surface 512*f* side of the first extended portion 522*a*, but preferably do not penetrate the insulating film 18.

The insulating film removed portion 30 not having the insulating film 18 may be formed on the surfaces 26*a*1 and 26*a*2 of the first extended portion 522*a* embedded in the element body 512 in the first end surface 512*e*, and the plurality of concave portions 28 may be formed in the surfaces 26*a*1 and 26*a*2 of the first extended portion 522*a* in the insulating film removed portion 30. Further, the metal magnetic particles 15 may be arranged in the concave portions 28.

As described above, when the metal magnetic particles 15 are arranged in the concave portions 28, peeling of the first extended portion 522*a* from the first end surface 512*e* is suppressed by an anchor effect.

Similarly, each of the plurality of concave portions 28 is formed in the surface 26*b*1 on the first main surface 512*a* side and the surface 26*b*2 on the second main surface 512*b* side of the second extended portion 522*b* of the conductive wire constituting the coil conductor 516. In addition, it is preferable that the concave portions 28 are formed in the surface 26*b*3 of the second extended portion 522*b* arranged perpendicularly to the second main surface 512*b*. The metal magnetic particles 15 and the insulating film 18 are arranged in the concave portions 28. Alternatively, only the metal magnetic particles 15 are arranged in the concave portions 28. At this time, when the metal magnetic particles 15 are arranged in the concave portions 28, the metal magnetic particles 15 may penetrate the insulating film 18 formed on the surface 26*b*1 on the first main surface 512*a* side and the surface 26*b*2 on the second main surface 512*b* side of the second extended portions 522*b*, and the surface 26*b*3 on the first end surface 512*e* side of the second extended portion 522*b*, but preferably do not penetrate the insulating film 18.

The insulating film removed portion 30 not having the insulating film 18 may be formed on the surfaces 26*b*1 and 26*b*2 of the second extended portion 522*b* embedded in the element body 512 in the second end surface 512*f*, and the plurality of concave portions 28 may be formed in the surfaces 26*b*1 and 26*b*2 of the second extended portion 522*b* in the insulating film removed portion 30. Further, the metal magnetic particles 15 may be arranged in the concave portions 28.

As described above, when the metal magnetic particles 15 are arranged in the concave portions 28, peeling of the second extended portion 522*b* from the second end surface 512*f* is suppressed by the anchor effect.

The first external electrode 40*a* includes the first base electrode layer 42*a* and the first plating layer 44*a* arranged on the surface of the first base electrode layer 42*a*. Similarly, the second external electrode 40*b* includes the second base electrode layer 42*b* and the second plating layer 44*b* arranged on the surface of the second base electrode layer 42*b*.

As illustrated in FIG. 15, when the first extended portion 522*a* of the coil conductor 516 is exposed from the first end surface 512*e*, the first base electrode layer 42*a* is arranged on the surface of the first end surface 512*e* of the element body 512. Therefore, the first base electrode layer 42*a* is in direct contact with the first exposed portion 524*a* of the coil conductor 516. Note that the first base electrode layer 42*a* may be formed so as to extend from the first end surface 512*e* and cover a part of each of the first main surface 512*a*, the second main surface 512*b*, the first side surface 512*c*, and the second side surface 512*d*, or may extend from the first end surface 512*e* and be formed so as to cover a part of each of the first end surface 512*e* and the second main surface 512*b*.

In addition, when the second extended portion 522*b* of the coil conductor 516 is exposed from the second end surface 512*f* as illustrated in FIG. 15, the second base electrode layer 42*b* is arranged on the surface of the second end surface 512*f* of the element body 512. Therefore, the second base electrode layer 42*b* is in direct contact with the second exposed portion 524*b* of the coil conductor 516. Note that the second base electrode layer 42*b* may be formed so as to extend from the second end surface 512*f* and cover a part of each of the first main surface 512*a*, the second main surface 512*b*, the first side surface 512*c*, and the second side surface 512*d*, or may extend from the second end surface 512*f* and be formed so as to cover a part of each of the second end surface 512*f* and the second main surface 512*b*.

In this case, the first base electrode layer 42*a* and the second base electrode layer 42*b* are composed of a plurality of crystal grains. The average crystal grain size b of the crystal grains constituting the first base electrode layer 42*a* and the second base electrode layer 42*b* is preferably equal to or more than 100 nm and equal to or less than 2000 nm (i.e., from 100 nm to 2000 nm), more preferably equal to or more than 100 nm and equal to or less than 1000 nm (i.e., from 100 nm to 1000 nm), and still more preferably equal to or more than 100 nm and equal to or less than 500 nm (i.e., from 100 nm to 500 nm).

Further, as illustrated in FIG. 15, when the first extended portion 522*a* of the coil conductor 516 is exposed from the first end surface 512*e*, the first plating layer 44*a* is arranged so as to cover the first base electrode layer 42*a*. To be specific, the first plating layer 44*a* may be arranged so as to cover the first base electrode layer 42*a* arranged on the first end surface 512*e*, further extend from the first end surface 512*e*, and arranged so as to cover the surface of the first base electrode layer 42*a* arranged on the first main surface 512*a*, the second main surface 512*b*, the first side surface 512*c*, and the second side surface 512*d*, or may extend from the first end surface 512*e*, and be arranged so as to cover the first base electrode layer 42*a* arranged so as to cover a part of each of the first end surface 512*e* and the second main surface 512*b*.

In addition, as illustrated in FIG. 15, when the second extended portion 522*b* of the coil conductor 516 is exposed from the second end surface 512*f*, the second plating layer 44*b* is arranged so as to cover the second base electrode layer 42*b*. To be specific, the second plating layer 44*b* may be arranged so as to cover the second base electrode layer 42*b* arranged on the second end surface 512*f*, further extend from the second end surface 512*f*, and arranged so as to cover the surface of the second base electrode layer 42*b* arranged on the first main surface 512*a*, the second main surface 512*b*, the first side surface 512*c*, and the second side surface 512*d*, or may extend from the second end surface 512*f*, and be arranged so as to cover the second base electrode layer 42*b* arranged so as to cover a part of each of the second end surface 512*f* and the second main surface 512*b*.

In addition, the minute uneven portion 32 is formed on surfaces of portions in which the first exposed portion 524*a* and the second exposed portion 524*b* of the coil conductor 516 are exposed on both the end surfaces 512*e* and 512*f* of the element body 512. Accordingly, since the contact surface area between the coil conductor 516 and the external electrode 40 can be increased, the bonding strength between the coil conductor 516 and the external electrode 40 can be further improved. The uneven portion 32 can be formed by, for example, irradiating the first exposed portion 524*a* and the second exposed portion 524*b* of the coil conductor 516 with a laser to form a plurality of holes.

Note that as for the structure around the exposed surface of the extended portion of the coil conductor 16 exposed on the surface of the element body 12, in FIG. 5 to FIG. 9, the configuration in which the extended portions 22*a* and 22*b* of the coil conductor 16 are extended and exposed on both the end surfaces 12*e* and 12*f* has been described, but the present disclosure is not limited thereto, and the structure around the exposed surfaces of the extended portions 522*a* and 522*b* exposed on both the end surfaces 512*e* and 512*f* has also the same structure as illustrated in FIG. 14.

2. Method of Manufacturing Coil Component

Next, a method of manufacturing the coil component will be described.

(A) Preparation of Metal Magnetic Particles

First, metal magnetic particles are prepared. Here, the metal magnetic particles are not particularly limited, and for example, Fe-based soft magnetic material powders such as α-Fe, Fe—Si, Fe—Si—Cr, Fe—Si—Al, Fe—Ni, and Fe—Co can be used. Also, the material form of the metal magnetic particles is preferably amorphous having good soft magnetic properties, but is not particularly limited, and may be crystalline.

The average particle size of the metal magnetic particles is also not particularly limited, but it is preferable to use two or more kinds of metal magnetic particles having different average particle sizes. That is, the metal magnetic particles are dispersed in the resin material. Therefore, from the viewpoint of improving the filling efficiency of the metal magnetic particles, it is preferable to use metal magnetic particles having different average particle sizes, for example, the first metal magnetic particles having the average particle size of equal to or more than 10 μm and equal to or less than 40 μm (i.e., from 10 μm to 40 μm), and the second metal magnetic particles having the average particle size of equal to or more than 1 μm and equal to or less than 20 μm (i.e., from 1 μm to 20 μm).

(B) Formation of Insulating Coating

Next, the surfaces of the metal magnetic particles are coated with an insulating coating. Here, when the insulating coating is formed by a mechanical method, the metal magnetic particles and the insulating material powder are fed into a rotary vessel, and composite of particles is performed by a mechanochemical treatment, whereby the insulating coating can be formed on the surface of the magnetic powder.

(C) Production of Magnetic Sheet

Next, a resin material is prepared. The resin material is not particularly limited, and for example, epoxy resin, phenol resin, polyester resin, polyimide resin, polyolefin resin, or the like can be used.

Subsequently, the metal magnetic particles coated with the insulating coating and other filler components (glass material, ceramic powder, ferrite powder, and the like) are mixed with a resin material to form a slurry, and then the slurry is subjected to molding processing using a doctor blade method or the like, followed by drying, thereby producing a magnetic sheet having a thickness of equal to or more than 50 μm and equal to or less than 300 μm (i.e., from 50 μm to 300 μm) in which the filler components are dispersed in the resin material.

(D) Production of Aggregate Substrate

Next, Cu is used as a wire conductor, and the coil conductor 16 having an α-winding shape formed of a rectangular conductive wire coated with the insulating film 18 is prepared. When necessary, the insulating film 18 in a region of 50 μm from the end of the coil conductor 16 is removed with a nipper-shaped clamp. Accordingly, the insulating film removed portion 30, which is a portion not covered with the insulating film 18, is formed in an annular shape with the extending direction of the coil conductor 16 as the central axis. Note that the insulating film 18 can be removed by burning off by heating, or may be dissolved by chemical or laser. At this time, the concave portions 28 may be provided in advance in the first extended portion 22*a* and the second extended portion 22*b* of the coil conductor 16.

Subsequently, the element body 12 in which the coil conductor 16 is embedded is manufactured.

FIGS. 16A-16D show a manufacturing process diagram illustrating an embodiment of manufacturing a first molded body in a method of manufacturing a coil component. FIGS. 17A-17D show a manufacturing process diagram illustrating an embodiment of manufacturing an aggregate substrate in the method of manufacturing the coil component.

Figure 16A:
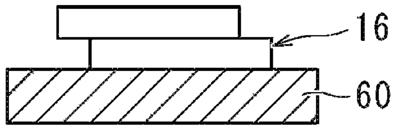
FIGS. 16A-16D show a manufacturing process diagram illustrating an embodiment of manufacturing a first molded body in a method of manufacturing a coil component.

First, as illustrated in FIG. 16A, a first mold 60 is prepared, and the coil conductor 16 is arranged on the first mold 60 in a matrix.

Figure 16B:
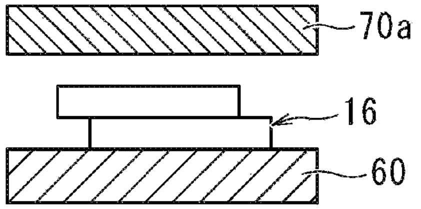
Figure 16C:
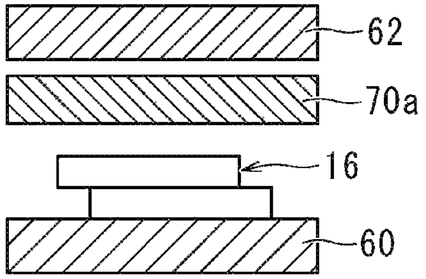
Figure 16D:
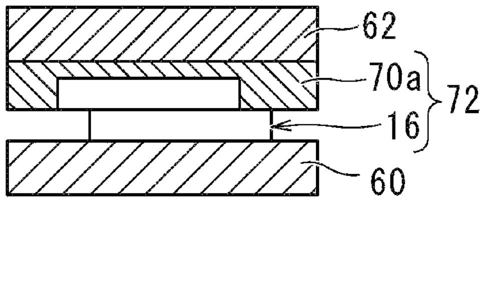

Next, as illustrated in FIG. 16B, a first magnetic sheet 70*a* of a mixture containing the first metal magnetic particles, the second metal magnetic particles, and a resin material is laminated on the coil conductor 16, and then, as illustrated in FIG. 16C, a second mold 62 is arranged on the upper surface side of the first magnetic sheet 70*a*. Then, as illustrated in FIG. 16D, the first magnetic sheet 70*a* is sandwiched between the coil conductor 16 on the first mold 60 and the second mold 62 to perform a primary press molding. By this primary press molding, at least a portion of the coil conductor 16 is embedded in the above-described sheet, and the mixture fills the inside of the coil conductor 16, whereby a first molded body 72 is produced.

Figure 17A:
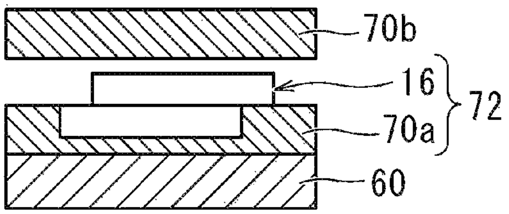
FIGS. 17A-17D show a manufacturing process diagram illustrating an embodiment of manufacturing an aggregate substrate in the method of manufacturing the coil component.
Figure 17B:
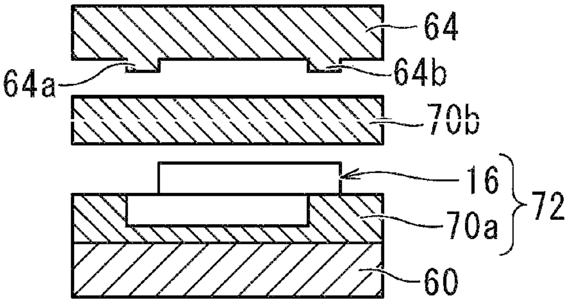
Figure 17C:
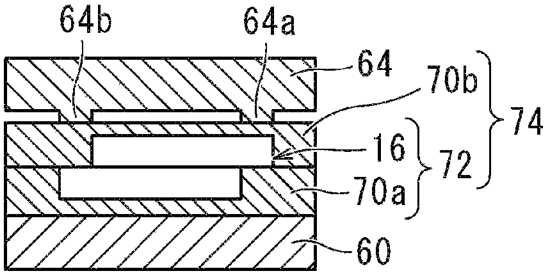

Next, as illustrated in FIG. 17A, the first molded body 72 obtained by the primary press molding, in which the coil conductor 16 is embedded, is detached from the second mold 62, the first molded body 72 is turned over, and the first molded body 72 is arranged on the first mold 60. Then, another second magnetic sheet 70*b* is laminated on the surface where the coil conductor 16 is exposed. Next, as illustrated in FIG. 17B, a third mold 64 is arranged on the upper surface side of the second magnetic sheet 70*b*. Then, as illustrated in FIG. 17C, the second magnetic sheet 70*b* is sandwiched between the first molded body 72 on the first mold 60 and the third mold 64, and secondary pressing is performed.

Note that in the third mold 64, convex portions 64*a* and 64*b* may be arranged at portions corresponding to the respective extended portions. When the convex portions 64*a* and 64*b* are arranged, the convex portions 64*a* and 64*b* can apply more pressure on the vicinity of the extended portion via the second magnetic sheet at the time of the secondary pressing. Therefore, as such, in the secondary pressing illustrated in FIG. 17C, the metal magnetic particles 15 and the insulating film 18 can be sunk in the surface of the first extended portion 22*a* and the surface of the second extended portion 22*b* of the coil conductor 16.

Note that alternatively, in the secondary pressing, the metal magnetic particles can be arranged so as to be sunk in by adjusting the pressure at the time of pressurization or by providing concave portions in advance in the surface of the extended portion.

Figure 17D:
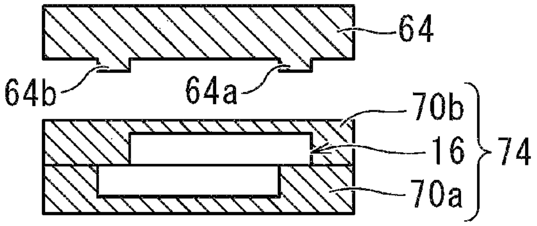

Subsequently, after the secondary pressing, as illustrated in FIG. 17D, the third mold 64 is detached, and an aggregate substrate (second molded body) 74 in which the entire coil conductor 16 is embedded in the first magnetic sheet 70*a* and the second magnetic sheet 70*b* is produced.

(E) Production of Element Body

Next, the first mold 60 and the third mold 64 are removed, and as illustrated in FIG. 17D, after an aggregate substrate 74 is produced, the aggregate substrate 74 is cut along cut lines by using a cutter such as a dicer to be divided into individual pieces, thereby producing the element body 12 in which the coil conductor 16 is embedded so that the first exposed portion 24*a* and the second exposed portion 24*b* of the coil conductor 16 are exposed from both end surfaces of the element body 12. The aggregate substrate 74 can be divided into the element bodies 12 using a dicing blade, various laser devices, a dicer, various cutting tools, or a mold. In a preferred aspect, the cut surface of each element body 12 is barrel-polished.

Next, the protection layer 50 is formed on the entire surface of the element body obtained as described above. The protection layer 50 can be formed by electrodeposition coating, a spray method, a dip method, or the like.

Peripheries of areas where the first exposed portion 24*a* and the second exposed portion 24*b* in the coil conductor 16 of the element body 12 coated with the protection layer 50 obtained as described above are arranged are irradiated with a laser beam, thereby removing the insulating film 18, the metal magnetic particles 15 and the insulating coating that coats the metal magnetic particles 15, and the protection layer 50 around the areas where the first exposed portion 24*a* and the second exposed portion 24*b* in the coil conductor 16 are arranged, and melting the metal magnetic particles 15. Note that alternatively, the protection layer 50 can also be removed by melting with a chemical, heating, peeling, a blast treatment, polishing, or the like, other than laser irradiation.

(F) Formation of External Electrodes

Next, the first external electrode 40*a* is formed on the first end surface 12*e* of the element body 12, and the second external electrode 40*b* is formed on the second end surface 12*f*.

First, Cu plating is performed on the element body 12 by electrolytic barrel plating, and a base electrode layer as a plating layer is formed. Subsequently, a Ni-plating layer is formed on the surface of the base electrode layer by Ni plating, further an Sn-plating layer is formed by Sn plating, and the external electrode 40 is formed. As such, the first exposed portion 24*a* of the coil conductor 16 is electrically connected to the first external electrode 40*a*, and the second exposed portion 24*b* of the coil conductor 16 is electrically connected to the second external electrode 40*b*. Note that the base electrode layer made by Cu plating may be formed by electroless plating. By forming the base electrode layer by electrolytic plating or electroless plating, the average crystal grain size b of the crystal grains 43 constituting the base electrode layer can be made smaller than the average crystal grain size a of the crystal grains 17 constituting the coil conductor 16. When formed by electrolytic barrel plating, the size of the crystal grains 43 constituting the base electrode layer can be reduced to obtain a desired average crystal grain size b by reducing the size of the medium or reducing the current value to reduce the current density. Alternatively, when the base electrode layer is formed by electrolytic plating or electroless plating, the size of the crystal grains 43 may be reduced by containing an additive such as organic carboxylic acids or organic sulfonic acids in order to obtain a desired average crystal grain size b.

As described above, the coil component 10 is manufactured.

Note that the metal magnetic particles 15 of the magnetic portion 14 may be arranged in the concave portion formed on the surface of the conductive wire in the winding portion 20 of the coil conductor 16 inside the element body 12.

The metal magnetic particles 15 of the magnetic portion 14 are arranged in the concave portions 28 formed in the surface of the first exposed portion 24*a* and the surface of the second exposed portion 24*b* of the coil conductor 16 from which the insulating film 18 is removed, and thus an anchor effect is generated by the metal magnetic particles 15, whereby the bonding strength between the magnetic portion 14 and the coil conductor 16 can be improved.

In addition, since the coil conductor 16 and the external electrode 40 are directly bonded to each other, the electric resistance can be reduced.

Note that as described above, the embodiments of the present disclosure are disclosed in the above description, but the present disclosure is not limited thereto.

That is, without departing from the scope of the technical idea and object of the present disclosure, various modifications can be made to the above-described embodiments in terms of mechanism, shape, material, quantity, position, arrangement, and the like, and these are included in the present disclosure.

What is claimed is:

1. A coil component comprising:

an element body including a coil conductor including a wound conductive wire coated with an insulating film, and a magnetic portion containing metal magnetic particles and resin; and an external electrode on a surface of the element body and electrically connected to an exposed surface of an extended portion of the coil conductor, the exposed surface being exposed on the surface of the element body, wherein the external electrode includes at least one or more layers, and when an average crystal grain size of crystal grains constituting the coil conductor is defined as a, and an average crystal grain size of crystal grains constituting the layer of the external electrode directly connected to the coil conductor is defined as b, a>b is satisfied.

2. The coil component according to claim 1, wherein the layer of the external electrode directly connected to the coil conductor is a plating layer.

3. The coil component according to claim 2, wherein a metal component constituting the coil conductor and a metal component constituting the layer of the external electrode connected to the coil conductor are metal components having the same composition of main components.

4. The coil component according to claim 2, wherein 0.5≥b/a is satisfied.

5. The coil component according to claim 2, wherein an insulating film removed portion that is absent of the insulating film is at an extended portion of the coil conductor, and the insulating film removed portion and the external electrode are directly connected to each other.

6. The coil component according to claim 2, wherein an uneven portion is on a surface of the exposed surface.

7. The coil component according to claim 2, wherein a recessed portion is in the element body around the exposed surface such that an average distance between the coil conductor and the magnetic portion increases in a direction in which the coil conductor is extended to a surface of the element body.

8. The coil component according to claim 2, wherein a groove portion having a depth of equal to from 5 μm to 100 μm is in the exposed surface.

9. The coil component according to claim 2, wherein an extended portion of the coil conductor is extended to a mounting surface of the element body, a plurality of concave portions is in a surface arranged perpendicular to a mounting surface of the element body among surfaces of an extended portion of the coil conductor, and the metal magnetic particles are in the concave portions.

10. The coil component according to claim 2, wherein an extended portion of the coil conductor is extended to a mounting surface of the element body, and an extending direction of an extended portion of the coil conductor is parallel to a mounting surface of the element body.

11. The coil component according to claim 1, wherein a metal component constituting the coil conductor and a metal component constituting the layer of the external electrode connected to the coil conductor are metal components having the same composition of main components.

12. The coil component according to claim 11, wherein 0.5≥b/a is satisfied.

13. The coil component according to claim 11, wherein an insulating film removed portion that is absent of the insulating film is at an extended portion of the coil conductor, and the insulating film removed portion and the external electrode are directly connected to each other.

14. The coil component according to claim 1, wherein 0.5≥b/a is satisfied.

15. The coil component according to claim 1, wherein an insulating film removed portion that is absent of the insulating film is at an extended portion of the coil conductor, and the insulating film removed portion and the external electrode are directly connected to each other.

16. The coil component according to claim 1, wherein an uneven portion is on a surface of the exposed surface.

17. The coil component according to claim 1, wherein a recessed portion is in the element body around the exposed surface such that an average distance between the coil conductor and the magnetic portion increases in a direction in which the coil conductor is extended to a surface of the element body.

18. The coil component according to claim 1, wherein a groove portion having a depth of equal to from 5 μm to 100 μm is in the exposed surface.

19. The coil component according to claim 1, wherein an extended portion of the coil conductor is extended to a mounting surface of the element body, a plurality of concave portions is in a surface arranged perpendicular to a mounting surface of the element body among surfaces of an extended portion of the coil conductor, and the metal magnetic particles are in the concave portions.

20. The coil component according to claim 1, wherein an extended portion of the coil conductor is extended to a mounting surface of the element body, and an extending direction of an extended portion of the coil conductor is parallel to a mounting surface of the element body.

* * * * *